US011965127B2

(12) United States Patent
Liu et al.

(10) Patent No.: US 11,965,127 B2
(45) Date of Patent: Apr. 23, 2024

(54) CATIONIC SILICONE SURFACTANTS AND METHOD OF PREPARING SAME

(71) Applicant: DOW SILICONES CORPORATION, Midland, MI (US)

(72) Inventors: Nanguo Liu, Midland, MI (US); Zachary Wenzlick, Midland, MI (US); Yang Cheng, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/789,184

(22) PCT Filed: Dec. 22, 2020

(86) PCT No.: PCT/US2020/066609
§ 371 (c)(1),
(2) Date: Jun. 25, 2022

(87) PCT Pub. No.: WO2021/138148
PCT Pub. Date: Jul. 8, 2021

(65) Prior Publication Data
US 2023/0060144 A1 Mar. 2, 2023

Related U.S. Application Data

(60) Provisional application No. 62/955,192, filed on Dec. 30, 2019.

(51) Int. Cl.
*C11D 1/62* (2006.01)
*C09K 23/38* (2022.01)
*C09K 23/54* (2022.01)

(52) U.S. Cl.
CPC .............. *C09K 23/54* (2022.01); *C09K 23/38* (2022.01)

(58) Field of Classification Search
CPC ........... C11D 1/62; C11D 1/82; C11D 3/3742; C11D 3/3738; C11D 7/3218; C11D 9/36; C11D 11/0017
See application file for complete search history.

(56) References Cited

U.S. PATENT DOCUMENTS

| | | | |
|---|---|---|---|
| 3,677,347 A | 7/1972 | Rosen et al. | |
| 4,149,978 A | 4/1979 | Goffinet | |
| 5,098,979 A * | 3/1992 | O'Lenick, Jr. | D06M 15/6436 548/957 |
| 5,124,466 A * | 6/1992 | Azechi | C08G 77/045 516/15 |
| 7,569,155 B2 | 8/2009 | Schaefer | |
| 2005/0164900 A1 | 7/2005 | Masschelein et al. | |
| 2008/0196908 A1 | 8/2008 | Schaefer | |
| 2013/0252869 A1* | 9/2013 | Oh | C11D 1/002 510/491 |
| 2017/0327732 A1* | 11/2017 | He | C09K 8/68 |
| 2018/0022139 A1* | 1/2018 | Oguri | B41M 5/52 428/32.5 |

FOREIGN PATENT DOCUMENTS

| | | |
|---|---|---|
| CN | 1216525 A | 5/1999 |
| EP | 0043622 A1 | 1/1982 |
| EP | 3328977 A1 | 6/2018 |
| WO | 199731889 A1 | 9/1997 |

OTHER PUBLICATIONS

Snow, Steven A. "Synthesis, characterization, stability, aqueous surface activity, and aqueous solution aggregation of the novel, cationic siloxane surfactants (Me3SiO) 2Si (Me)-(CH2) 3+ NMe2 (CH2) 2OR X-(R= hydrogen, acetyl, N-phenylcarbamyl; X= chloride, bromide, iodide, nitrate, methyl sulfate)." Langmuir 9.2 (1993): 424-430.
Schmaucks, G., et al. "Effect of siloxanyl groups on the interfacial behavior of quaternary ammonium compounds." Langmuir 8.7 (1992): 1724-1730.
International Search Report for PCT/US2020/066609 dated Jul. 22, 2021, 7 pages.

* cited by examiner

*Primary Examiner* — Charles I Boyer
(74) *Attorney, Agent, or Firm* — WARNER NORCROSS + JUDD LLP

(57) ABSTRACT

A cationic surfactant is disclosed. The cationic surfactant has the general formula $[Z-D-N(-D^1-NR^1_3+)_a(R)_{2-a}][X^-]_a$ where Z is a siloxane moiety or an unsubstituted hydrocarbyl moiety having from 5 to 20 carbon atoms, D is a covalent bond or a divalent linking group, $D^1$ is a divalent linking group, R is H or an unsubstituted hydrocarbyl group having from 1 to 4 carbon atoms, each $R^1$ is an independently selected unsubstituted hydrocarbyl group having from 1 to 4 carbon atoms, subscript a is 1 or 2, and each X is an anion. A method of preparing the cationic surfactant is also disclosed.

13 Claims, No Drawings

CATIONIC SILICONE SURFACTANTS AND METHOD OF PREPARING SAME

CROSS-REFERENCE TO RELATED APPLICATIONS

This application is the U.S. National Stage of International Application No. PCT/US2020/066609 filed on 22 Dec. 2020, which claims priority to and all advantages of U.S. Provisional Patent Application No. 62/955,192 filed on 30 Dec. 2019, the content of which is incorporated herein by reference.

FIELD OF THE INVENTION

The present disclosure relates generally to surfactants and, more specifically, to a cationic surfactant and a method of preparing the same.

DESCRIPTION OF THE RELATED ART

Surfactants and surfactant compositions are known in the art and are utilized in myriad end use applications and environments. In particular, surfactants and surfactant compositions are utilized in numerous industrial, commercial, home care, and personal care formulations. As but one example, surfactants and surfactant compositions are commonly utilized in the preparation of a wide variety of surface treatments and coating compositions, e.g. to influence the characteristics of the compositions themselves as well as to provide surface effects to substrates threated with such surface treatment/coating compositions. For example, polyfluoroalkyl-based surfactants and compositions thereof have been widely employed in industrial compositions as fume suppressants and etching additives, in surface treatments for imparting water and oil repellency to the surface of articles such as carpeting, upholstery, apparel, textiles, etc., as well as in many commercial products such as cleaning compositions, waxes, sealants, and foams.

Unfortunately, however, polyfluoroalkyl-based surfactants have been shown to decompose or otherwise degrade under environmental conditions to give numerous fluorochemicals, some of which have been found to be environmentally persistent due to many of the desired properties of such compounds that resulted in their wide-spread use (e.g. high chemical resistance, wide chemical compatibility, high lipophobicity, etc.). As such, polyfluoroalkyl-based surfactants are increasingly being phased out of production and use, leading to many widely utilized surfactants and surfactant compositions becoming unavailable for continued use.

BRIEF SUMMARY

The present disclosure provides a cationic surfactant. The cationic surfactant has the general formula:

$$[Z\text{-}D\text{-}N(\text{-}D^1\text{-}NR^1{}_3{}^+)_a(R)_{2\text{-}a}][X^-]_a \quad (I),$$

wherein Z is a siloxane moiety or an unsubstituted hydrocarbyl moiety having from 5 to 20 carbon atoms, D is a covalent bond or a divalent linking group, $D^1$ is a divalent linking group, R is H or an unsubstituted hydrocarbyl group having from 1 to 4 carbon atoms, each $R^1$ is an independently selected unsubstituted hydrocarbyl group having from 1 to 4 carbon atoms, subscript a is 1 or 2, and each X is an anion.

The present disclosure also provides a method of preparing a cationic surfactant (the "preparation method"). The preparation method comprises reacting (A) an amine compound and (B) a quaternary ammonium compound to give the cationic surfactant. The amine compound (A) has the general formula (II):

$$Z\text{-}D\text{-}N(H)_a(R)_{2\text{-}a} \quad (II),$$

where Z is a siloxane moiety or an unsubstituted hydrocarbyl moiety having from 5 to 20 carbon atoms, D is a covalent bond or a divalent linking group, R is H or an unsubstituted hydrocarbyl group having from 1 to 4 carbon atoms, and subscript a is 1 or 2. The quaternary ammonium compound (B) has the general formula (III):

$$[R^8 NR^1{}_3]^+[X]^- \quad (III),$$

where $R^8$ is an amine-reactive group, each $R^1$ is an independently selected unsubstituted hydrocarbyl group having from 1 to 4 carbon atoms, and X is an anion.

DETAILED DESCRIPTION

A cationic surfactant is provided. The cationic surfactant has the general formula (I):

$$[Z\text{-}D\text{-}N(\text{-}D^1\text{-}NR^1{}_3{}^+)_a(R)_{2\text{-}a}][X^-]_a \quad (I),$$

where Z is a siloxane moiety or an unsubstituted hydrocarbyl moiety having from 5 to 20 carbon atoms, D is a covalent bond or a divalent linking group, $D^1$ is a divalent linking group, R is H or an unsubstituted hydrocarbyl group having from 1 to 4 carbon atoms, each $R^1$ is an independently selected unsubstituted hydrocarbyl group having from 1 to 4 carbon atoms, subscript a is 1 or 2, and each X is an anion.

With regard to formula (I), as introduce above, Z represents a siloxane moiety or an unsubstituted hydrocarbyl moiety. For clarity and ease of reference, with respect to specific embodiments below, Z may be referred to more particularly as the "siloxane moiety Z" or "hydrocarbyl moiety Z", e.g. when Z is the siloxane moiety or the hydrocarbyl moiety, respectively. Both the siloxane moiety Z and the hydrocarbyl moiety Z are described in turn below.

In certain embodiments, the cationic surfactant comprises the siloxane moiety Z. The siloxane moiety Z comprises a siloxane and is otherwise not particularly limited. As understood in the art, siloxanes comprise an inorganic silicon-oxygen-silicon group (i.e., —Si—O—Si—), with organosilicon and/or organic side groups attached to the silicon atoms. As such, siloxanes may be represented by the general formula $([R^x{}_i SiO_{(4-i)/2}]_h)_j(R^x)_{3-j}Si$—, where subscript i is independently selected from 1, 2, and 3 in each moiety indicated by subscript h, subscript h is at least 1, subscript j is 1, 2, or 3, and each $R^x$ is independently selected from hydrocarbyl groups, alkoxy and/or aryloxy groups, and siloxy groups.

Hydrocarbyl groups suitable for $R^x$ include monovalent hydrocarbon moieties, as well as derivatives and modifications thereof, which may independently be substituted or unsubstituted, linear, branched, cyclic, or combinations thereof, and saturated or unsaturated. With regard to such hydrocarbyl groups, the term "unsubstituted" describes hydrocarbon moieties composed of carbon and hydrogen atoms, i.e., without heteroatom substituents. The term "substituted" describes hydrocarbon moieties where either at least one hydrogen atom is replaced with an atom or group other than hydrogen (e.g. a halogen atom, an alkoxy group, an amine group, etc.) (i.e., as a pendant or terminal substituent), a carbon atom within a chain/backbone of the hydrocarbon is replaced with an atom other than carbon (e.g. a heteroatom, such as oxygen, sulfur, nitrogen, etc.) (i.e., as a part of the chain/backbone), or both. As such, suitable hydrocarbyl groups may comprise, or be, a hydrocarbon moiety having one or more substituents in and/or on (i.e., appended to and/or integral with) a carbon chain/backbone thereof, such that the hydrocarbon moiety may comprise, or be, an ether, an ester, etc. Linear and branched hydrocarbyl groups may independently be saturated or unsaturated and, when unsaturated, may be conjugated or nonconjugated. Cyclic hydrocarbyl groups may independently be monocyclic or polycyclic, and encompass cycloalkyl groups, aryl groups, and heterocycles, which may be aromatic, saturated and nonaromatic and/or non-conjugated, etc. Examples of combinations of linear and cyclic hydrocarbyl groups include alkaryl groups, aralkyl groups, etc. General examples of hydrocarbon moieties suitably for use in or as the hydrocarbyl group include alkyl groups, aryl groups, alkenyl groups, alkynyl groups, halocarbon groups, and the like, as well as derivatives, modifications, and combinations thereof. Examples of alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, and the like (i.e., other linear or branched saturated hydrocarbon groups, e.g. having greater than 6 carbon atoms). Examples of aryl groups include phenyl, tolyl, xylyl, naphthyl, benzyl, dimethyl phenyl, and the like, as well as derivatives and modifications thereof, which may overlap with alkaryl groups (e.g. benzyl) and aralkyl groups (e.g. tolyl, dimethyl phenyl, etc.). Examples of alkenyl groups include vinyl, allyl, propenyl, isopropenyl, butenyl, isobutenyl, pentenyl, heptenyl, hexenyl, cyclohexenyl groups, and the like, as well as derivatives and modifications thereof. General examples of halocarbon groups include halogenated derivatives of the hydrocarbon moieties above, such as halogenated alkyl groups (e.g. any of the alkyl groups described above, where one or more hydrogen atoms is replaced with a halogen atom such as F or Cl), aryl groups (e.g. any of the aryl groups described above, where one or more hydrogen atoms is replaced with a halogen atom such as F or Cl), and combinations thereof. Examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, 3,4-difluoro-5-methylcycloheptyl, chloromethyl, chloropropyl, 2-dichlorocyclopropyl, 2,3-dichlorocyclopentyl, and the like, as well as derivatives and modifications thereof. Examples of halogenated aryl groups include chlorobenzyl, pentafluorophenyl, fluorobenzyl groups, and the like, as well as derivatives and modifications thereof.

Alkoxy and aryloxy groups suitable for $R^x$ include those having the general formula —$OR^{xi}$, where $R^{xi}$ is one of the hydrocarbyl groups set forth above with respect to $R^x$. Examples of alkoxy groups include methoxy, ethoxy, propoxy, butoxy, benzyloxy, and the like, as well as derivatives and modifications thereof. Examples of aryloxy groups include phenoxy, tolyloxy, pentafluorophenoxy, and the like, as well as derivatives and modifications thereof.

Examples of suitable siloxy groups suitable for $R^x$ include [M], [D], [T], and [Q] units, which, as understood in the art, each represent structural units of individual functionality present in siloxanes, such as organosiloxanes and organopolysiloxanes. More specifically, [M] represents a monofunctional unit of general formula $R^{xii}_3SiO_{1/2}$; [D] represents a difunctional unit of general formula $R^{xii}_2SiO_{2/2}$; [T] represents a trifunctional unit of general formula $R^{xii}SiO_{3/2}$; and [Q] represents a tetrafunctional unit of general formula $SiO_{4/2}$, as shown by the general structural moieties below:

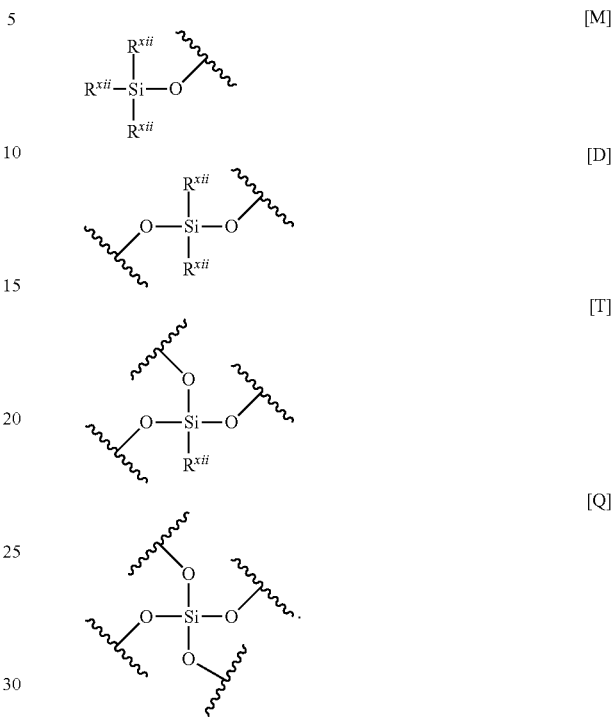

In these general structural moieties, each $R^{xii}$ is independently a monovalent or polyvalent substituent. As understood in the art, specific substituents suitable for each $R^{xii}$ are not limited, and may be monoatomic or polyatomic, organic or inorganic, linear or branched, substituted or unsubstituted, aromatic, aliphatic, saturated or unsaturated, and combinations thereof. Typically, each $R^{xii}$ is independently selected from hydrocarbyl groups, alkoxy and/or aryloxy groups, and siloxy groups. As such, each $R^{xii}$ may independently be a hydrocarbyl group of formula —$R^{xi}$ or an alkoxy or aryloxy group of formula —$OR^{xi}$, where $R^{xi}$ is as defined above, or a siloxy group represented by any one, or combination, of [M], [D], [T], and/or [Q] units described above.

The siloxane moiety Z may be linear, branched, or combinations thereof, e.g. based on the number and arrangement of [M], [D], [T], and/or [Q] siloxy units present therein. When branched, the siloxane moiety Z may minimally branched or, alternatively, may be hyperbranched and/or dendritic.

In certain embodiments, the siloxane moiety Z is a branched siloxane moiety having the formula —$Si(R^3)_3$, wherein at least one $R^3$ is —$OSi(R^4)_3$ and each other $R^3$ is independently selected from $R^2$ and —$OSi(R^4)_3$, where each $R^4$ is independently selected from $R^2$, —$OSi(R^5)_3$, and —$[OSiR^2_2]_mOSiR^2_3$. With regard to these selections for $R^4$, each $R^5$ is independently selected from $R^2$, —$OSi(R^6)_3$, and —$[OSiR^2_2]_mOSiR^2_3$, and each $R^6$ is independently selected from $R^2$ and —$[OSiR^2_2]_mOSiR^2_3$. In each selection, $R^2$ is an independently selected substituted or unsubstituted hydrocarbyl group, such as any of those described above with respect to $R^x$, and each subscript m is individually selected such that $0 \leq m \leq 100$ (i.e., in each selection where applicable).

As introduced above, each $R^3$ is selected from $R^2$ and —$OSi(R^4)_3$, with the proviso that at least one $R^3$ is of formula —OSi(R⁴)₃. In certain embodiments, at least two of R³ are of formula —OSi(R⁴)₃. In specific embodiments, each R³ is of formula —OSi(R⁴)₃. It will be appreciated that a greater number of R³ being —OSi(R⁴)₃ increases the level of branching in the siloxane moiety Z. For example, when each R³ is —OSi(R⁴)₃, the silicon atom to which each R³ is bonded is a T siloxy unit. Alternatively, when two of R³ are of formula OSi(R⁴)₃, the silicon atom to which each R³ is bonded is a [D] siloxy unit. Moreover, when R³ is of formula —OSi(R⁴)₃, and when R⁴ is of formula —OSi(R⁵)₃, further siloxane bonds and branching are present in the siloxane moiety Z. This is further the case when R⁵ is of formula —OSi(R⁶)₃. As such, it will be understood by those of skill in the art that each subsequent R$^{3+n}$ moiety in the siloxane moiety Z can impart a further generation of branching, depending on the particular selections thereof. For example, R⁴ can be of formula —OSi(R⁵)₃, and R⁵ can be of formula —OSi(R⁶)₃. Thus, depending on a selection of each substituent, further branching attributable to [T] and/or [Q] siloxy units may be present in the siloxane moiety Z (i.e., beyond those of other substituents/moieties described above).

Each R⁴ is selected from R², —OSi(R⁵)₃, and —[OSiR²₂]$_m$OSiR²₃, where 0≤m≤100. Depending on a selection of R⁴ and R⁵, further branching can be present in the siloxane moiety Z. For example, when each R⁴ is R², then each —OSi(R⁴)₃ moiety (i.e., each R³ of formula —OSi(R⁴)₃) is a terminal [M] siloxy unit. Said differently, when each R³ is —OSi(R⁴)₃, and when each R⁴ is R², then each R³ can be written as —OSiR²₃ (i.e., an [M] siloxy unit). In such embodiments, the siloxane moiety Z includes a [T] siloxy unit bonded to group D in formula (I), which [T] siloxy unit is capped by three [M] siloxy units. Moreover, when of formula —[OSiR²₂]$_m$OSiR²₃, R⁴ includes optional [D] siloxy units (i.e., those siloxy units in each moiety indicated by subscript m) as well as an [M] siloxy unit (i.e., represented by OSiR²₃). As such, when each R³ is of formula —OSi(R⁴)₃ and each R⁴ is of formula —[OSiR²₂]$_m$OSiR²₃, then each R³ includes a [Q] siloxy unit. More specifically, in such embodiments, each R³ is of formula —OSi([OSiR²₂]$_m$OSiR²₃)₃, such that when each subscript m is 0, each R³ is a [Q] siloxy unit endcapped with three [M] siloxy units. Likewise, when subscript m is greater than 0, each R³ includes a linear moiety (i.e., a diorganosiloxane moiety) with a degree of polymerization being attributable to subscript m.

As set forth above, each R⁴ can also be of formula —OSi(R⁵)₃. In embodiments where one or more R⁴ is of formula —OSi(R⁵)₃, further branching can be present in the siloxane moiety Z depending a selection of R⁵. More specifically, each R⁵ is selected from R², —OSi(R⁶)₃, and —[OSiR²₂]$_m$OSiR²₃, where each R⁶ is selected from R² and —[OSiR²₂]$_m$OSiR²₃, and where each subscript m is defined above.

Subscript m is from (and including) 0 to 100, alternatively from 0 to 80, alternatively from 0 to 60, alternatively from 0 to 40, alternatively from 0 to 20, alternatively from 0 to 19, alternatively from 0 to 18, alternatively from 0 to 17, alternatively from 0 to 16, alternatively from 0 to 15, alternatively from 0 to 14, alternatively from 0 to 13, alternatively from 0 to 12, alternatively from 0 to 11, alternatively from 0 to 10, alternatively from 0 to 9, alternatively from 0 to 8, alternatively from 0 to 7, alternatively from 0 to 6, alternatively from 0 to 5, alternatively from 0 to 4, alternatively from 0 to 3, alternatively from 0 to 2, alternatively from 0 to 1, alternatively is 0. In certain embodiments, each subscript m is 0, such that the siloxane moiety Z is free from D siloxy units.

Importantly, each of R², R³, R⁴, R⁵, and R⁶ are independently selected. As such, the descriptions above relating to each of these substituents is not meant to mean or imply that each substituent is the same. Rather, any description above relating to R⁴, for example, may relate to only one R⁴ or any number of R⁴ in the siloxane moiety Z, and so on. In addition, different selections of R², R³, R⁴, R⁵, and R⁶ can result in the same structures. For example, if R³ is —OSi(R⁴)₃, and if each R⁴ is —OSi(R⁵)₃, and if each R⁵ is R², then R³ can be written as —OSi(OSiR²₃)₃. Similarly, if R³ is —OSi(R⁴)₃, and if each R⁴ is —[OSiR²₂]$_m$OSiR²₃, R³ can be written as —OSi(OSiR²₃)₃ when subscript m is 0. As shown, these particular selections result in the same final structure for R³, based on different selections for R⁴. To that end, any proviso of limitation on final structure of the siloxane moiety Z is to be considered met by an alternative selection that results in the same structure required in the proviso.

In certain embodiments, each R² is an independently selected alkyl group. In some such embodiments, each R² is an independently selected alkyl group having from 1 to 10, alternatively from 1 to 8, alternatively from 1 to 6, alternatively from 1 to 4, alternatively from 1 to 3, alternatively from 1 to 2 carbon atom(s).

In particular embodiments, each subscript m is 0 and each R² is methyl, and the siloxane moiety Z has one of the following structures (i)-(iv):

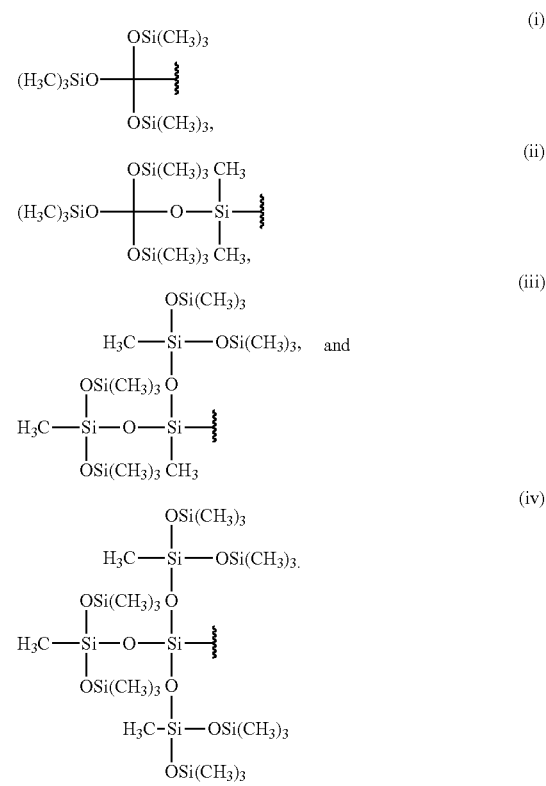

In certain embodiments, the cationic surfactant comprises the hydrocarbyl moiety Z. In general, the hydrocarbyl moiety Z is an unsubstituted hydrocarbyl moiety having from 5 to 20 carbon atoms, and is otherwise not particularly limited. Examples of suitable such hydrocarbyl moieties include the unsubstituted monovalent hydrocarbon moieties described above with respect to $R^x$. As such, it will be appreciated that the hydrocarbyl moiety Z may comprise, alternatively may be, linear, branched, cyclic, or combinations thereof. Likewise, the hydrocarbyl group Z may comprise aliphatic unsaturation, including ethylenic and/or acetylenic unsaturation (i.e., C—C double and/or triple bonds, otherwise known as alkenes and alkynes, respectively). The hydrocarbyl group Z may comprise but one such unsaturated group or, alternatively, may comprise more than one unsaturated group, which may be nonconjugated, or conjugated (e.g. when the hydrocarbyl moiety Z comprises a diene, a eneyne, diyne, etc.) and/or aromatic (e.g. when the hydrocarbyl moiety Z comprises a phenyl group, benzyl group, etc.).

In certain embodiments, the hydrocarbyl moiety Z comprises, alternatively is, an alkyl group. Suitable alkyl groups include saturated alkyl groups, which may be linear, branched, cyclic (e.g. monocyclic or polycyclic), or combinations thereof. Examples of such alkyl groups include those having the general formula $C_bH_{2b-2c+1}$, where subscript b is from 5 to 20 (i.e., the number of carbon atoms present in the alkyl group), subscript c is the number of independent rings/cyclic loops, and at least one carbon atom designated by subscript b is bonded to group D in general formula (I) above. Examples of linear and branched isomers of such alkyl groups (i.e., where the alkyl group is free from cyclic groups such that subscript c=0), include those having the general formula $C_bH_{2b+1}$, where subscript b is as defined above and at least one carbon atom designated by subscript b is bonded to group D in general formula (I) above. Examples of monocyclic alkyl groups include those having the general formula $C_bH_{2b-1}$, where subscript b is as defined above and at least one carbon atom designated by subscript b is bonded to group D in general formula (I) above.

Specific examples of such alkyl groups include pentyl groups, hexyl groups, heptyl groups, octyl groups, nonyl groups, decyl groups, undecyl groups dodecyl groups, tridecyl groups, tetradecyl groups, pentadecyl groups, hexadecyl groups, heptadecyl groups, octadecyl groups, nonadecyl groups, and eicosyl groups, including linear, branched, and/or cyclic isomers thereof. For example, pentyl groups encompass n-pentyl (i.e., a linear isomer) and cyclopentyl (i.e., a cyclic isomer), as well as branched isomers such as isopentyl (i.e., 3-methylbutyl), neopentyl (i.e., 2,2-dimethylpropy), tert-pentyl (i.e., 2-methylbutan-2-yl), sec-pentyl (i.e., pentan-2-yl), sec-isopentyl (i.e., 3-methylbutan-2-yl etc.), 3-pentyl (i.e., pentan-3-yl), and active pentyl (i.e., 2-methylbutyl).

In certain embodiments, the hydrocarbyl moiety Z comprises, alternatively is, an unsubstituted linear alkyl group of formula $—(CH_2)_{b-1}CH_3$, where subscript b is from 5 to 20 as described above. In some such embodiments, the hydrocarbyl moiety Z is such an unsubstituted linear alkyl group, where subscript b is from 7 to 19, such that the hydrocarbyl moiety Z is an unsubstituted linear alkyl group having from 6 to 18 carbon atoms. In certain such embodiments, subscript b is 7, 9, 11, or 13, such that the hydrocarbyl moiety Z is an unsubstituted linear alkyl group having 6, 8, 10, or 12 carbon atoms, respectively.

With further regard to the cationic surfactant and formula (I), as introduced above, D represents a covalent bond or a divalent linking group. The particular D present in the cationic surfactant is generally a function of the mechanism utilized to prepare the cationic surfactant, as illustrated by components and parameters of the compositions, methods, and examples herein. For clarity and ease of reference, with respect to specific embodiments below, D may be referred to more particularly as the "covalent bond D" or "divalent linking group D", e.g. when D is the covalent bond or the divalent linking group, respectively. Both selections are described and illustrated in certain embodiments below.

In certain embodiments, D is the covalent bond (i.e., the cationic surfactant comprises the covalent bond D), such that moiety Z is bonded directly to the amino N atom. In these embodiments, the cationic surfactant may be represented by the following formula:

$$[Z—N(-D^1-NR^1_3{}^+)_a(R)_{2-a}][X^-]_a,$$

where Z is as defined and described above, and each $D^1$, R, $R^1$, subscript a, and X is as defined above and described below.

In particular embodiments, D is the covalent bond and Z is the hydrocarbyl moiety (i.e., the cationic surfactant comprises the covalent bond D and the hydrocarbyl moiety Z). In some such embodiments, the hydrocarbyl moiety Z is an alkyl group bonded directly to the amino N atom of the cationic surfactant, such that the cationic surfactant has the following formula:

$$[(C_bH_{2b+1})—N(-D_1-NR^1_3{}^+)_a(R)_{2-a}][X^-]_a,$$

where subscript b is as defined and described above, and each $D^1$, R, $R^1$, subscript a, and X is as defined above and described below. In some such embodiments, subscript b is from 6 to 18, such as from 6 to 14, alternatively from 6 to 12.

In certain embodiments, D is the divalent linking group (i.e., the cationic surfactant comprises the divalent linking group D). In such embodiments, as will be understood by those of skill in the art, the cationic surfactant generally conforms to formula (I) above, as modified by any further selections of the variables and moieties therein. The divalent linking group D is not particularly limited, and may be substituted or unsubstituted, linear or branched, or combinations thereof.

Typically, divalent linking group D is selected from divalent hydrocarbon groups. Examples of such hydrocarbon groups include divalent forms of the hydrocarbyl and hydrocarbon groups described above, such as any of those set forth above with respect to $R^x$. As such, it will be appreciated that suitable hydrocarbon groups for the divalent linking group D may be substituted or unsubstituted, and linear, branched, and/or cyclic.

In certain embodiments, divalent linking group D comprises, alternatively is, a $C_1$-$C_{18}$ hydrocarbon moiety, such as a linear hydrocarbon moiety having the formula $—(CH_2)_d—$, where subscript d is from 1 to 18. In some such embodiments, subscript d is from 1 to 16, such as from 1 to 12, alternatively from 1 to 10, alternatively from 1 to 8, alternatively from 1 to 6, alternatively from 2 to 6, alternatively from 2 to 4. In particular embodiments, subscript d is 3, such that divalent linking group D comprises a propylene (i.e., a chain of 3 carbon atoms). As will be appreciated by those of skill in the art, each unit represented by subscript d is a methylene unit, such that linear hydrocarbon moiety may be defined or otherwise referred to as an alkylene group. It will also be appreciated that each methylene group may independently be unsubstituted and unbranched, or substituted (e.g. with a hydrogen atom replaced with a non-hydrogen atom or group) and/or branched (e.g. with a hydrogen atom replaced with an alkyl group). In certain embodiments, divalent linking group D comprises, alternatively is, an unsubstituted alkylene group. In other embodiments, divalent linking group D comprises, alternatively is, a substituted hydrocarbon group, such as a substituted alkylene group. In such embodiments, for example, divalent linking group D typically comprises a carbon backbone having at least 2 carbon atoms and at least one heteroatom (e.g. O, N, S, etc.), such that the backbone comprises an ether moiety, amine moiety, etc.

In particular embodiments, divalent linking group D comprises, alternatively is, an amino substituted hydrocarbon (i.e., a hydrocarbon comprising a nitrogen-substituted carbon chain/backbone). For example, in some such embodiments, the divalent linking group D is an amino substituted hydrocarbon having formula $-D^2-NY-D^2-$, such that the cationic surfactant may be represented by the following formula:

$$[Z-D^2-NY-D^2-N(-D^1-NR^1_3{}^+)_a(R)_{2-a}][X^-]_a,$$

where Z is as defined and described above, each $D^2$ is an independently selected divalent linking group and Y is H or a quaternary ammonium moiety, and each $D^1$, R, $R^1$, subscript a, and X is as defined above and described below.

As introduced above, each $D^2$ of the amino substituted hydrocarbon is independently selected. Typically, each $D^2$ comprises an independently selected alkylene group, such as any of those described above with respect to divalent linking group D. For example, in some embodiments, each $D^2$ is independently selected from alkylene groups having from 1 to 8 carbon atoms, such as from 2 to 8, alternatively from 2 to 6, alternatively from 2 to 4 carbon atoms. In certain embodiments, each $D^2$ is propylene (i.e., $-(CH_2)_3-$). However, it is to be appreciated that one or both $D^2$ may be, or comprise, another divalent linking group (i.e., aside from the alkylene groups described above). Moreover, each $D^2$ may be substituted or unsubstituted, linear or branched, and various combinations thereof.

As also introduced above, Y of the amino substituted hydrocarbon is H or a quaternary ammonium moiety. For example, in particular embodiments, Y is H, such that the cationic surfactant may be represented by the following formula:

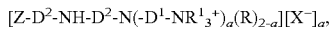
$$[Z-D^2-NH-D^2-N(-D^1-NR^1_3{}^+)_a(R)_{2-a}][X^-]_a,$$

where each Z and $D^2$ is as defined and described above, and each $D^1$, R, $R^1$, subscript a, and X is as defined above and described below.

In other embodiments, Y is the quaternary ammonium moiety, which is represented by formula $-D^1-NR^1_3{}^+X^-$, where $D^1$, $R^1$, and X are as defined above and described below. Accordingly, in such embodiments, the cationic surfactant may be represented by the following formula:

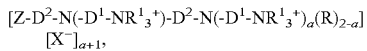
$$[Z-D^2-N(-D^1-NR^1_3{}^+)-D^2-N(-D^1-NR^1_3{}^+)_a(R)_{2-a}][X^-]_{a+1},$$

where each Z and $D^2$ is as defined and described above, each $D^1$, R, $R^1$, subscript a, and X is as defined above and described below. In some such embodiments, Z is the siloxane moiety, and comprises a silicon atom linked to the amino N atom of the cationic surfactant via one of divalent linking groups $D^2$. For example, in these embodiments the siloxane moiety Z is the branched siloxane moiety described above, such that the cationic surfactant has the following formula:

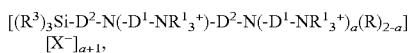
$$[(R^3)_3Si-D^2-N(-D^1-NR^1_3{}^+)-D^2-N(-D^1-NR^1_3{}^+)_a(R)_{2-a}][X^-]_{a+1},$$

where each $D^2$ and $R^3$ is as defined and described above, and each $D^1$, R, $R^1$, subscript a, and X is as defined above and described below.

With continued regard to the cationic surfactant, as represented by formula (I) and the derivative formulas thereof set forth above, subscript a is 1 or 2. As will be appreciated by those of skill in the art, subscript a indicates whether the quaternary ammonium-substituted amino moiety of the cationic surfactant represented by subformula $-N(-D^1-NR^1_3{}^+)_a(R)_{2-a}$ has one or two quaternary ammonium groups (i.e., the group of subformula $(-D^1-NR^1_3{}^+)$. Likewise, as each such quaternary ammonium groups is cationic, subscript a also indicates the number of counter anions (i.e., number of anions X, as described below) required to balance out the cationic charge from the quaternary ammonium groups. For example, in some embodiments, subscript a is 1, and the cationic surfactant has the following formula:

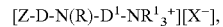
$$[Z-D-N(R)-D^1-NR^1_3{}^+][X^-],$$

where Z and D are as defined and described above, and each $D^1$, R, $R^1$ and X is as defined above and described below. In some such embodiments, divalent linking group D is the amino substituted hydrocarbon having formula $-D^2-NY-D^2-$, where Y is the quaternary ammonium moiety having formula $-D^1-NR^1_3{}^+X^-$, such that the cationic surfactant has the following formula:

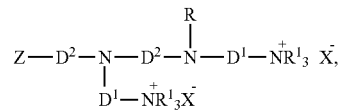

where Z and each $D^2$ is as defined and described above, and each $D^1$, R, $R^1$, and X is as defined above and described below.

In some embodiments, subscript a is 2, and the cationic surfactant has the following formula:

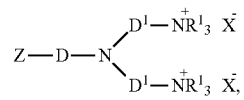

where Z and D are as defined and described above, and each $D^1$, $R^1$ and X is as defined above and described below. In some such embodiments, divalent linking group D is the amino substituted hydrocarbon having formula $-D^2-NY-D^2-$, where Y is the quaternary ammonium moiety having formula $-D^1-NR^1_3{}^+X^-$, such that the cationic surfactant has the following formula:

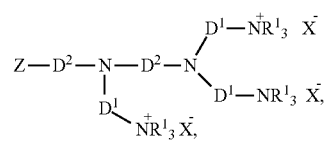

where Z and each $D^2$ is as defined and described above, and each $D^1$, $R^1$, and X is as defined above and described below.

It is to be appreciated that, while subscript a is 1 or 2 in each molecule of the cationic surfactant, the cationic surfactant may comprise a mixture of molecules that correspond to formula (I) but are different from one another (e.g. with respect to subscript a). As such, while subscript a is 1 or 2 in each molecule, a mixture comprising the cationic surfactant may have a average value of a of from 1 to 2, such as an average value of 1.5 (e.g. from a 50:50 mixture of molecules of the cationic surfactant where a=1 to and molecules of the cationic surfactant where a=2.

With further regard to the cationic surfactant, as represented by formula (I) and the derivative formulas thereof set forth above, R represents H or an unsubstituted hydrocarbyl group having from 1 to 4 carbon atoms, when present (e.g. when subscript a is 1). In some embodiments, R is H. In other embodiments, R an alkyl group having from 1 to 4 carbon atoms, such as from 1 to 3, alternatively from 1 to 2 carbon atom(s). For example, R may be a methyl group, an ethyl group, a propyl group (e.g. an n-propyl or iso-propyl group), or a butyl group (e.g. an n-butyl, sec-butyl, iso-butyl, or tert-butyl group). In certain embodiments, R is methyl.

With continued regard to the cationic surfactant, as represented by formula (I) and the derivative formulas thereof set forth above, each $R^1$ represents an independently selected unsubstituted hydrocarbyl group having from 1 to 4 carbon atoms. For example, in certain embodiments, each $R^1$ is independently selected from alkyl groups having from 1 to 4 carbon atoms, such as from 1 to 3, alternatively from 1 to 2 carbon atom(s). In such embodiments, each $R^1$ is typically selected from methyl groups, ethyl groups, propyl groups (e.g. n-propyl and iso-propyl groups), and butyl group (e.g. n-butyl, sec-butyl, iso-butyl, and tert-butyl groups). While independently selected, in certain embodiments each $R^1$ is the same as each other $R^1$ in the cationic surfactant. For example, in certain embodiments, each $R^1$ is methyl or ethyl. In specific embodiments, each $R^1$ is methyl.

With further regard to the cationic surfactant, as represented by formula (I) and the derivative formulas thereof set forth above, each $D^1$ represents an independently selected divalent linking group ("linking group $D^1$"). The particular linking group(s) $D^1$ present in the cationic surfactant is generally a function of the mechanism utilized to prepare the cationic surfactant, as illustrated by components and parameters of the compositions, methods, and examples herein.

Typically, linking group $D^1$ is selected from substituted and unsubstituted divalent hydrocarbon groups. Examples of such hydrocarbon groups include divalent forms of the hydrocarbyl and hydrocarbon groups described above, such as any of those set forth above with respect to $R^x$, D, and $D^2$. As such, it will be appreciated that suitable hydrocarbon groups for use in or as linking group $D^1$ may be linear or branched.

In certain embodiments, linking group $D^1$ comprises an alkylene group, such as one of those described above with respect to divalent linking group D. For example, in certain embodiments, linking group $D^1$ comprises an alkylene group having from 1 to 8 carbon atoms, such as from 1 to 6, alternatively from 2 to 6, alternatively from 2 to 4 carbon atoms. In some such embodiments, the alkylene group of linking group $D^1$ is unsubstituted. Examples of such alkylene groups include methylene groups, ethylene groups, propylene groups, butylene groups, etc.

In certain embodiments, linking group $D^1$ comprises, alternatively is, a substituted hydrocarbon group, such as a substituted alkylene group. In such embodiments, for example, linking group $D^1$ typically comprises a carbon backbone having at least 2 carbon atoms, and at least one heteroatom (e.g. O) in the backbone or bonded to one of the carbon atoms thereof (e.g. as a pendant substituent).

For example, in some embodiments, linking group $D^1$ comprises a hydroxyl-substituted hydrocarbon having formula -$D^3$-CH(—$(CH_2)_e$—OH)-$D^3$-, where each $D^3$ is independently a covalent bond or a divalent linking group, and subscript e is 0 or 1. In such embodiments, at least one $D^3$ typically comprises an independently selected alkylene group, such as any of those described above. For example, in some embodiments, each $D^3$ is independently selected from alkylene groups having from 1 to 8 carbon atoms, such as from 1 to 6, alternatively from 1 to 4, alternatively from 1 to 2 carbon atoms. In certain embodiments, each $D^3$ is methylene (i.e., —$CH_2$—). However, it is to be appreciated that one or both $D^2$ may be, or comprise, another divalent linking group (i.e., aside from the alkylene groups described above).

In some embodiments, each linking group $D^1$ is an independently selected hydroxypropylene group (i.e., where each $D^3$ is an independently selected from the covalent bond and methylene, with the provisos that at least one $D^3$ is the covalent bond when subscript e is 1, and each $D^3$ is methylene when subscript e is 0). Accordingly, in some such embodiments, each linking group $D^1$ is independently of one of the following formulas:

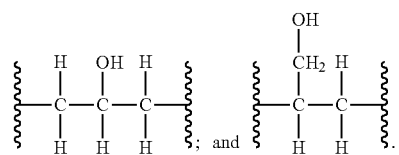 [SMILES: *CC(O)C* ; *CC(*)CO]

In certain embodiments, Z is the unsubstituted hydrocarbyl moiety and the hydrocarbyl moiety Z is a linear alkyl group having from 6 to 18 carbon atoms, D is the covalent bond, subscript a is 1, R is H, each linking group $D^1$ is a (2-hydroxy)propylene group, and each $R^1$ is methyl, such that the cationic surfactant has the following formula:

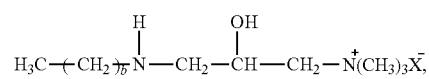

where subscript b is from 5 to 17 (e.g. from 5 to 11, alternatively from 5 to 9), and X is as defined above and described below. In other embodiments, the cationic surfactant is configured the same as described immediately above, but with subscript a=2, such that the cationic surfactant has the following formula:

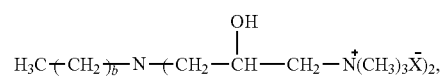

where subscript b is as defined and described above, and each X is as defined above and described below.

In some embodiments, Z is the siloxane moiety, D is the divalent linking group, siloxane moiety Z is the branched siloxane moiety, divalent linking group D is the amino substituted hydrocarbon having formula -$D^2$-NY-$D^2$- where each $D^2$ is propylene and Y is H, subscript a is 1, R is H, each linking group $D^1$ is a (2-hydroxy)propylene group, and each $R^1$ is methyl, such that the cationic surfactant has the following formula:

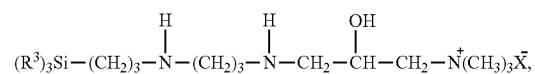

where each $R^3$ is as defined and described above, and X is as defined above and described below. In other embodiments, the cationic surfactant is configured the same as described immediately above, but with subscript a=2, such that the cationic surfactant has the following formula:

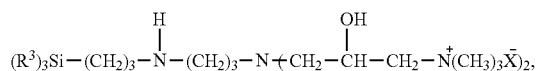

where each $R^3$ is as defined and described above, and each X is as defined above and described below. In other embodiments, the cationic surfactant is configured the same as described immediately above, but with Y being the quaternary ammonium moiety having formula -$D^1$-$NR^1_3{}^+X^-$, such that the cationic surfactant has the following formula:

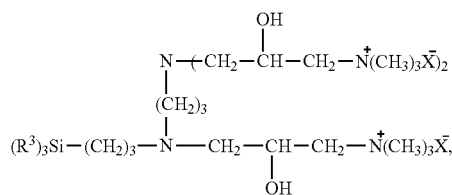

where each $R^3$ is as defined and described above, and each X is as defined above and described below. In yet other embodiments, the cationic surfactant is configured the same as described immediately above, but with subscript a=1 and R being H, such that the cationic surfactant has the following formula:

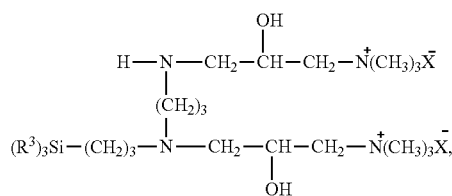

where each $R^3$ is as defined and described above, and each X is as defined above and described below.

With continued regard to the cationic surfactant, as represented by formula (I) and the derivative formulas thereof set forth above, X represents an anion. X is not particularly limited and, as will be understood by those of skill in the art in view of the description herein, is typically ion-paired with a cationic quaternary ammonium moiety present in the cationic surfactant. More specifically, the cationic surfactant typically comprises at least one anion X per cationic quaternary ammonium moiety, with each such anion X being independently selected. However, X may be polyanionic (e.g. dianionic, etc.), such that one anion X may be sufficient to counterbalance two or more cationic quaternary ammonium moieties present in the cationic surfactant. As such, the number of anions X will be readily selected, e.g. based on the structure of the cationic surfactant. The particular anion(s) X present in the cationic surfactant is generally a function of the mechanism utilized to prepare the cationic surfactant, as illustrated by components, methods, and parameters of the compositions, methods, and examples herein.

Examples of suitable anions include organic anions, inorganic anions, and combinations thereof. Typically, each anion X is independently selected from monoanions that are unreactive the other moieties of the cationic surfactant. Examples of such anions include conjugate bases of medium and strong acids, such as halide ions (e.g. chloride, bromide, iodide, fluoride), sulfates (e.g. alkyl sulfates, etc.), sulfonates (e.g. triflates, benzyl or other aryl sulfonates, etc.), and the like, as well as derivatives, modifications, and combinations thereof. Other anions may also be utilized, such as phosphates, nitrates, organic anions such as carboxylates (e.g. acetates), and the like, as well as derivatives, modifications, and combinations thereof. It is to be appreciated that derivatives of such anions include polyanionic compounds comprising two or more functional groups for which the above examples are named. For example, mono and/or polyanions of polycarboxylates (e.g. citric acid, etc.) are encompassed by the anions above. Other examples of anions include tosylate anions, bis(trifluoromethanesulfonyl)imide anions, bis(fluorosulfonyl)imide anions, hexafluorophosphate anions, tetrafluoroborate anions, and the like, as well as derivatives, modifications, and combinations thereof.

In certain embodiments, each anion X is an inorganic anion having one to three valences. Examples of such anions include monoanions such as chlorine, bromine, iodine, aryl sulfonates having six to 18 carbon atoms, nitrates, nitrites, and borate anions, dianions such as sulfate and sulfite, and trianions such as phosphate. In certain embodiments, each X is a halide anion. In some such embodiments, each X is chloride (i.e., Cl⁻).

A method of preparing the cationic surfactant is also provided, and is generally referred to hereinafter as the "preparation method". The preparation method comprises reacting (A) an amine compound and (B) a quaternary ammonium compound to give the cationic surfactant. The cationic surfactant prepared according to the preparation method corresponds to formula (I) set forth above.

As will be understood by one of skill in the art in view of the description herein, the amine compound (A) utilized in the preparation method forms a portion of the cationic surfactant corresponding to the amino moiety represented by subformula Z-D-N(R)— in formula (I). Likewise, the quaternary ammonium compound (B) utilized in the preparation method forms a portion of the cationic surfactant corresponding to the quaternary ammonium moiety represented by subformula —$NR^1_3{}^+$ in formula (I). As described in additional detail below, the linking group $D^1$ is generally formed by the reaction of components (A) and (B), subscript a is controlled by the nature/type of component (A) and relative amounts of component (A) and (B) utilized, and anion X is controlled by the nature/type of component (B) utilized. As such, it is to be appreciated that the description of the cationic surfactant above applies equally to the preparation method (e.g. to the components thereof), unless indicated otherwise.

In general, the amine compound (A) is an organic or organosilicon compound having at least one alkylatable amine functional group (i.e., a primary or secondary amine). Specifically, the amine compound (A) has the general formula (II):

Z-D-NHR    (II), where Z, D, and R are as defined and described above with respect to the cationic surfactant.

More specifically, with reference to formula (II), Z is a siloxane moiety or an unsubstituted hydrocarbyl moiety having from 5 to 20 carbon atoms, D is a covalent bond or a divalent linking group, and R is H or an unsubstituted hydrocarbyl group having from 1 to 4 carbon atoms. Notwithstanding the above, one of skill in the art will readily understand the particular variations of limitations of variables Z, D, and R in general formula (II) in view of the description of the same variables of the cationic surfactant described above with respect to general formula (I).

In certain embodiments, D in general formula (II) above is the covalent bond, such that the amine compound (A) has the formula Z—NHR, where Z and R are as defined above. In some such embodiments, R is H, such that the amine compound (A) has the formula Z—$NH_2$, where Z and is as defined above. In other such embodiments, R is the unsubstituted hydrocarbyl group having from 1 to 4 carbon atoms. In some such embodiments, R is a $C_1$-$C_4$ alkyl group, such that the amine compound (A) has the formula Z—NH—($C_bH_{2b+1}$), where subscript b is 1, 2, 3, or 4, and Z is as defined above. For example, in particular such embodiments, subscript b is 1, such that the amine compound (A) is a methyl amine having formula Z—$NHCH_3$, where Z is as defined above.

In some embodiments, D in general formula (II) above is the covalent bond and Z is the hydrocarbyl moiety, such that the amine compound (A) may be further defined as an organoamine. In some such embodiments, the hydrocarbyl moiety Z is an alkyl group having from 5 to 20 carbon atoms (i.e., a $C_5$-$C_{20}$ alkyl group), such that the amine compound (A) is an alkylamine having formula ($C_bH_{2b+1}$)—NHR, where subscript b is from 5 to 20, and R is as defined above. For example, in certain such embodiments, R is H, such that the amine compound (A) is a $C_5$-$C_{20}$ primary alkylamine. Examples of such alkylamines include pentylamines, hexylamines, heptylamines, octylamines, nonylamines, decylamines, undecylamines, dodecylamines, tridecylamines, tetradecylamines, pentadecylamines, hexadecylamines, heptadecylamines, and octadecylamines, including linear, branched, and/or cyclic isomers thereof. For example, pentylamines encompass 1-pentylamine (i.e., 1-aminopentane, a linear isomer) and cyclopentylamine (i.e., a cyclic isomer), as well as branched isomers such as isopentylamine, neopentylamine, tert-pentylamine (i.e., tert-amylamine), sec-pentylamine (i.e., 2-aminopentane), sec-isopentylamine (i.e., 3-methylbutylamine, 3-pentylamine (i.e., 3-aminopentane), and 2-methylbutylamine. In other such embodiments, R is the $C_1$-$C_4$ alkyl group, such that the amine compound (A) is a dialkylamine (i.e., a secondary amine), having one of the $C_5$-$C_{20}$ alkyl groups described above as well as one alkyl group selected from methyl, ethyl, propyl, and butyl groups. For example, such a dialkylamine suitable for use as the amine compound (A) includes N-methyloctylamine (i.e., methyl(octyl)amine).

In certain embodiments, D in general formula (II) above is the divalent linking group and Z is the siloxane moiety, such that the amine compound (A) is an organoaminosiloxane having the formula ([$R^x_jSiO_{(4-i)/2}]_h)_j(R^x)_{3-j}$Si-D-NHR, where $R^x$ D, R, subscript h, subscript i, and subscript j are independently selected and as defined above. In particular such embodiments, the siloxane moiety Z is the branched siloxane moiety such that the amine compound (A) is a branched aminosiloxane having formula ($R^3)_3$Si-D-NHR, where R, divalent linking group D, and the branched organosilicon moiety represented by the subformula ($R^3)_3$Si— are as defined and described above with respect to the same moieties of the cationic surfactant. More specifically, R is H or an unsubstituted $C_1$-$C_4$ hydrocarbyl group, D is the divalent linking group, and each $R^3$ is generally selected from $R^2$ and —OSi($R^4)_3$, with the proviso that at least one $R^3$ is —OSi($R^4)_3$, where each $R^4$ is independently selected from $R^2$, —OSi($R^5)_3$, and —[$OSiR^2_2]_mOSiR^2_3$, wherein each $R^5$ is independently selected from $R^2$, —OSi($R^6)_3$, and —[$OSiR^2_2]_mOSiR^2_3$, and where each $R^6$ is independently selected from $R^2$ and —[$OSiR^2_2]_mOSiR^2_3$. In each instance, each $R^2$ is an independently selected substituted or unsubstituted hydrocarbyl group, and each subscript m is individually selected such that $0 \leq m \leq 100$. Notwithstanding the above, one of skill in the art will readily understand the particular variations of limitations of the branched organosilicon moiety ($R^3)_3$Si— in view of the description of the same moiety in the cationic surfactant above.

In some embodiments, siloxane moiety Z in general formula (II) above is the branched organosilicon moiety and divalent linking group D is an amino substituted hydrocarbon having formula -$D^2$-NH-$D^2$-, such that the amine compound (A) has the formula ($R^3)_3$Si-$D^2$-NH-$D^2$-NHR, where each $D^2$ is an independently selected divalent linking group and each R and $R^3$ are as defined above.

In some embodiments, the amine compound (A) has the following formula:

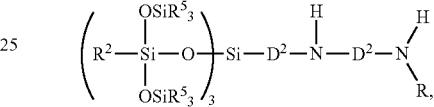

where each R, $R^2$, $R^5$, and $D^2$ are independently selected and defined above. In certain such embodiments, each $R^5$ is $R^2$, and each $R^2$ is methyl. In some such embodiments, each R is H.

In particular embodiments, the amine compound (A) has the following structure:

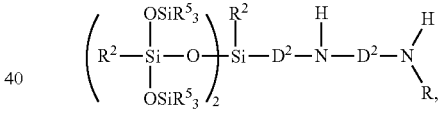

where each R, $R^2$, $R^5$, and $D^2$ are independently selected and defined above. In certain such embodiments, each $R^5$ is $R^2$, and each $R^2$ is methyl. In some such embodiments, each R is H.

In certain embodiments, the amine compound (A) has the following structure:

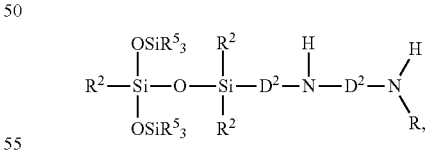

where each R, $R^2$, $R^5$, and $D^2$ are independently selected and defined above. In certain such embodiments, each $R^5$ is $R^2$, and each $R^2$ is methyl. In some such embodiments, each R is H.

In the exemplary structures set forth above pertaining to the siloxane moiety Z being the branched organosilicon moiety, certain embodiments are listed where each $R^5$ is $R^2$ and each $R^2$ is methyl. However, it is to be appreciated that further generational branching can be introduced into the branched organosilicon moiety when $R^5$ is other than $R^2$, i.e., when $R^5$ is selected from $OSi(R^6)_3$ and —[$OSiR^2_2]_m$ OSiR²₃, where each R⁶ is selected from R² and —[OSiR²₂]ₘOSiR²₃ and each R² and subscript m is independently selected and as defined above.

The amine compound (A) may be utilized in any amount, which will be selected by one of skill in the art, e.g. dependent upon the particular components selected for reacting, the reaction parameters employed, the scale of the reaction (e.g. total amounts of component (A) to be reacted and/or cationic surfactant to be prepared), etc.

The amine compound (A)) may be prepared as part of the preparation method, or otherwise obtained (i.e., as a prepared compound). Methods of preparing compounds suitable for use in, or as, the amine compound (A) are known in the art, and some of such compounds are commercially available from various suppliers. Additionally, preparing the amine compound (A), when part of the preparation method, may be performed prior to the reaction of components (A) and (B), or in situ (i.e., during the reaction of components (A) and (B)).

In general, the quaternary ammonium compound (B) is an tetra(organo)ammonium-anion complex, with the tetra(organo)ammonium cation having a quaternary ammonium moiety and an amine-reactive group, i.e., a group capable of forming a covalent bond between the quaternary ammonium compound (B) and the alkylatable amine of the amine compound (A). Specifically, the quaternary ammonium compound (B) has the general formula (III):

$$R^8\text{—}NR^1_3{}^+[X^-] \quad (III),$$

where the quaternary ammonium moiety represented by subformula —NR¹₃⁺ and the counter anion moiety [X⁻] are as defined and described above with respect to the cationic surfactant, and R⁸ is an amine-reactive group.

More specifically, with reference to the quaternary ammonium moiety —NR¹₃⁺ and the counter anion moiety [X⁻] in formula (III), each R¹ is an independently selected unsubstituted hydrocarbyl group having from 1 to 4 carbon atoms, X is an anion. Notwithstanding the above, one of skill in the art will readily understand the particular variations of limitations of variables R¹ and X in general formula (III) in view of the description of the same variables of the cationic surfactant described above with respect to general formula (I).

In certain embodiments, each R¹ in general formula (III) above is selected from C₁-C₄ alkyl groups, such as an methyl groups, ethyl groups, propyl groups (e.g. n-propyl and iso-propyl groups), and butyl group (e.g. n-butyl, sec-butyl, iso-butyl, and tert-butyl groups). In specific embodiments, each R¹ is methyl or ethyl. In particular embodiments, each R¹ is methyl, such that the tetra(organo)ammonium cation of the quaternary ammonium compound (B) (i.e., the portion of component (B) represented by subformula R⁸—NR¹₃⁺ in general formula (III) above) may be further defined as an organo(trimethylammonium) compound having the formula R⁸—N(CH₃)₃⁺[X⁻].

Typically, X in general formula (III) above is a monoanion, such as an inorganic or organic monoanion (e.g. a halide, aryl sulfonate, nitrate, nitrite, or borate anion, etc.). In certain embodiments, X is a halide anion. In some such embodiments, each X is chloride (i.e., Cl⁻). It will be appreciated that X may instead represent a polyanion, e.g. where more than one tetra(organo)ammonium molecules are present in the tetra(organo)ammonium-anion complex of quaternary ammonium compound (B).

As introduced above, R⁸ is an amine-reactive group. The amine-reactive group R⁸ is not particularly limited, and may comprise any group suitable for preparing the cationic surfactant of formula (I) from the amine compound (A) and the quaternary ammonium compound (B). More specifically, R⁸ is a group capable of reacting with the alkylatable amine of the amine compound (A) (e.g. in a coupling reaction) to form a covalent bond between the quaternary ammonium compound (B) and the amine compound (A). In particular, as will be understood by those of skill in the art in view of the description herein, the amine-reactive group R⁸ forms linking group D¹ of the cationic surfactant. The coupling reaction of components (A) and (B) may be classified, characterized, or otherwise described based on the particular selected of the amine-reactive group R⁸, and likewise the reaction of the alkylatable amine of the amine compound (A) therewith. Examples of suitable coupling reactions include nucleophilic substitutions, ring-opening additions, condensations, nucleophilic additions (e.g. Michael additions), alkylations, and the like, as well as combinations thereof. One of skill in the art will readily appreciate that such coupling reactions may overlap in scope, such that different coupling reactions may be similarly classified/characterized.

Accordingly, the amine-reactive group R⁸ may comprise, alternatively may be, a functional group that is condensable (e.g. a hydroxyl group, a carboxyl group, an anhydride group, etc., or a group that is hydrolyzable and then subsequently condensable), displaceable (e.g. a "leaving group" as understood in the art, such as a halogen atom, or other group stable in an ionic form once displaced, or a functional group comprising such a leaving group, such as esters, anhydrides, amides, epoxides, etc.), electrophilic (e.g. isocyanates, epoxides, etc.), or various combinations thereof. In certain embodiments, the amine-reactive group R⁸ comprises an epoxide group or a halogen atom.

In certain embodiments, the amine-reactive group R⁸ in general formula (III) is an epoxide-functional group having the formula CH(O)CH-D⁴-, such that the tetra(organo)ammonium cation moiety of the quaternary ammonium compound (B) has the formula:

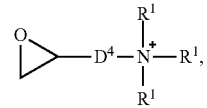

where each R¹ is independently selected and as defined above, and D⁴ is a divalent linking group.

In general, D⁴ is selected from divalent substituted or unsubstituted hydrocarbon groups, which may optionally be modified or substituted, e.g. with alkoxy, siloxy, silyl, amino, amido, acetoxy, and aminoxy groups. D⁴ may be linear or branched. In some embodiments, D⁴ is a C₁-C₂₀ hydrocarbon group. However, D⁴ may be a hydrocarbon groups comprising a backbone having at least one heteroatom (e.g. O, N, S, etc.). For example, in some embodiments, D⁴ is a hydrocarbon having a backbone comprising an ether moiety. In some such embodiments, D⁴ is selected such that the amine-reactive group R⁸ comprises a glycidyl ether. In other embodiments, D⁴ is an alkylene group, such as methylene, ethylene, etc. In certain embodiments, D⁴ is methylene, such that the amine-reactive group R⁸ is an epoxypropyl group.

In certain embodiments, the tetra(organo)ammonium cation moiety of the quaternary ammonium compound (B) has the formula:

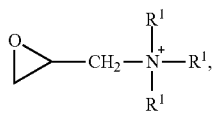

where each $R^1$ is independently selected and as defined above. In some such embodiments, each $R^1$ is methyl.

In some embodiments, the amine-reactive group $R^8$ in general formula (III) is a haloalkyl group having the formula X'-$D^4$-, where $D^4$ is as defined above, and X' is chlorine or bromine. For example, in such embodiments, the amine-reactive group $R^8$ may comprise, alternatively may be, a haloethyl group, a halopropyl group, a halobutyl group, a halopentyl group, a halohexyl group, a haloheptyl grous, a halooctyl group, etc., such as the chloro or bromo versions of such groups (e.g. 5-bromopentyl, 2-chloroethyl, 2-bromoethyl, etc.), as well as derivatives and modifications thereof (e.g. 3-chloro-2-hydroxypropyl, etc.).

Specific examples of compounds suitable for use as the quaternary ammonium compound (B) include glycidyltrimethylammonium chloride, (3-chloro-2-hydroxypropyl)trimethylammonium chloride, (5-bromopentyl)trimethylammonium bromide, (2-bromoethyl)trimethylammonium bromide, (2-chloroethyl)trimethylammonium chloride, and the like, as well as derivatives, modifications, and combinations thereof (alternative salt forms, alternative haloforms (e.g. bromo vs. chloro, chloro vs. bromo, etc.), etc.). In certain embodiments, other compounds may also be utilized in or as the quaternary ammonium compound (B), such as (3-carboxypropyl)trimethylammonium chloride, [3-(methacryloylamino)propyl]trimethylammonium chloride, [2-(acryloyloxy)ethyl]trimethylammonium chloride, and the like, as well as derivatives, modifications and combinations thereof.

The quaternary ammonium compound (B) may be utilized in any amount, which will be selected by one of skill in the art, e.g. dependent upon the particular components selected for reacting, the reaction parameters employed, the scale of the reaction (e.g. total amounts of component (B) to be reacted and/or cationic surfactant to be prepared), etc.

The quaternary ammonium compound (B) may be prepared as part of the preparation method, or otherwise obtained (i.e., as a prepared compound). Methods of preparing compounds suitable for use in, or as, the quaternary ammonium compound (B) are known in the art, and some of such compounds are commercially available from various suppliers. Additionally, preparing the quaternary ammonium compound (B), when part of the preparation method, may be performed prior to the reaction of components (A) and (B), or in situ (i.e., during the reaction of components (A) and (B), such that component (B) is consumed upon formation, e.g. via combining components of the quaternary ammonium compound (B) with component (A) and, optionally, a catalyst).

Each of components (A) and (B) may be obtained or formed. More specifically, as introduced above, each of the amine compound (A), quaternary ammonium compound (B) may be provided "as is", i.e., ready for the reaction to prepare the cationic surfactant. Alternatively, either or both of components (A) and (B) may be formed prior to or during the reaction. As such, in some embodiments, the preparation method comprises preparing the amine compound (A) and/or the quaternary ammonium compound (B). In specific embodiments, the preparation method comprises preparing the amine compound (A).

Each of components (A) and (B) may be utilized in any form, such as neat (i.e., absent solvents, carrier vehicles, diluents, etc.), or disposed in a carrier vehicle, such as a solvent or dispersant, as described in further detail below. For example, in certain embodiments, the reaction of components (A) and (B) is carried out in the presence of a carrier vehicle (e.g. a solvent, diluent, dispersant, etc.). In general, the carrier vehicle comprises, alternatively is, a solvent, a fluid, an oil (e.g. an organic oil and/or a silicone oil), etc., or a combination thereof.

In certain embodiments, the carrier vehicle comprises, alternative is, water. The water is not particularly limited. For example, purified water such as distilled water and ion exchanged water, saline, a phosphoric acid buffer aqueous solution, and the like, or combinations and/or modifications thereof, can be used. In some such embodiments, the carrier vehicle comprises water and at least one other solvent, such as a water-miscible organic solvent or fluid, or a water immiscible solvent or fluid.

In some embodiments, the carrier vehicle comprises an organic solvent. Examples of organic solvents include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane, and chloroform; dimethyl sulfoxide; dimethyl formamide, acetonitrile; tetrahydrofuran; white spirits; mineral spirits; naphtha; n-methylpyrrolidone; and the like, as well as derivatives, modifications, and combination thereof. In certain embodiments, the carrier vehicle comprises a polar organic solvent, such as a solvent compatible with water. Specific examples of such polar organic solvents utilized in certain embodiments include methanol, ethanol, 1-propanol, 2-propanol, 2-methyl-2-propanol, 2-butanone, tetrahydrofuran, acetone, and combinations thereof.

In certain embodiments, the carrier vehicle comprises an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.), $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogentated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the carrier vehicle comprises a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm²/sec. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m²/s.

Other carrier vehicles may also be utilized. For example, in some embodiments, the carrier vehicle comprises an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis(trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis(trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl)imide, lithium bis(trifluoromethanesulfonyl)imide, and the like, as well as derivatives, modifications, and combinations thereof.

When utilized, the carrier vehicle will be selected based on the particular components of the reaction, such as the particular amine compound (A) and/or quaternary ammonium compound (B) selected, in view of a desired coupling reaction thereof, etc. More specifically, in some embodiments, the carrier vehicle is selected based on the nature and type of amine-reactive group $R^8$ in and/or the type of coupling reaction involving the same. For example, in certain embodiments, the preparation method is carried out in the presence of a carrier vehicle or solvent comprising a polar component, such as water, an alcohol, ether, acetonitrile, dimethylformamide, dimethylsulfoxide, and the like, or combinations thereof. Likewise, it will be appreciated that portions of carrier vehicle or solvent may be added to or otherwise combined with the amine compound (A), the quaternary ammonium compound (B), and/or other components (if/when utilized) discretely, collectively with mixtures of components, or with the reaction mixture as a whole. Likewise, the amine compound (A) and/or the quaternary ammonium compound (B) may be combined with the carrier vehicle, if utilized, prior to, during, or after being combined with any one or more other components of the reaction. The total amount of carrier vehicle/solvent present in the reaction mixture will be selected by one of skill in the art, e.g. based on the particular component selected, the reaction parameters employed, etc.

In certain embodiments, the amine compound (A) and/or the quaternary ammonium compound (B) is free from, alternatively substantially free from carrier vehicles. In some such embodiments, the amine compound (A) and/or the quaternary ammonium compound (B) is free from, alternatively substantially free from, carrier vehicles/volatiles reactive with the amine compound (A), the quaternary ammonium compound (B), the cationic surfactant being prepared, and/or any one or more other components of the reaction. For example, in certain embodiments, the preparation method may comprise stripping the amine compound (A) and/or the quaternary ammonium compound (B) of volatiles and/or solvents prior to combining the same with any one or more other components of the reaction. Techniques for stripping are known in the art, and may include heating, drying, applying reduced pressure/vacuum, azeotroping with solvents, utilizing molecular sieves, etc., and combinations thereof. In these embodiments, the reaction of components (A) and (B) is typically carried out in the absence of any carrier vehicle or solvent, i.e., such that no carrier vehicle or solvent is present in the reaction mixture during the reaction (e.g. the reaction mixture is free from, alternatively substantially free from, solvents). The above notwithstanding, in certain embodiments, one or both of components (A) and (B) may be a carrier, e.g. when utilized as a fluid in an amount sufficient to carry, dissolve, or disperse any other component(s) of the reaction mixture.

The relative amounts of the amine compound (A) and the quaternary ammonium compound (B) utilized may vary, e.g. based upon the particular amine compound (A) selected, the particular quaternary ammonium compound (B) selected, the reaction parameters employed, e.g. whether a catalyst or other component is utilized, etc. Typically, an excess (e.g. molar and/or stoichiometric) of one of components (A) and (B) is utilized to fully transform or consume the amine compound (A) and/or he quaternary ammonium compound (B), e.g. to simplify purification of the reaction product formed therefrom. For example, in certain embodiments, the quaternary ammonium compound (B) is utilized in relative excess of the amine compound (A)) to maximize alkylation of the amine compound (A) to prepare the cationic surfactant therefrom. It will be appreciated that the amine compound (A) may instead be used in excess of the quaternary ammonium compound (B) (e.g. when maximum consumption of the quaternary ammonium compound (B) is desired, limited alkylation of the of the amine compound (A) is desired, etc.).

As understood by those of skill in the art, the alkylation/coupling of amine compound (A) with the quaternary ammonium compound (B) occurs at a theoretical maximum based on the number alkylatable amino groups (e.g. N—H groups) within the amine compound (A). In particular, with reference to general formula (II) of the amine compound (A) above, the amine moiety of formula —NHR can be alkylated once when R is the unsubstituted hydrocarbyl group, and twice when R is H. Moreover, when the divalent linking group D is the amino substituted hydrocarbon moiety of formula -$D^2$-NH-$D^2$-, the amine compound (A) comprises another alkylatable amino group. As such, the amine compound (A) comprises one, alternatively two, alternatively three alkylatable amino groups depending on the selection of R and the divalent linking group D of general formula (II) above. Each of these alkylatable amino groups can be reacted with one of the amine-reactive group $R^8$, such that that one molar equivalent of the quaternary ammonium compound (B) is needed for every alkylatable amino group of the amine compound (A) to achieve a theoretically complete (i.e., maximum) alkylation reaction. Likewise, the theoretical maximum stoichiometric ratio of the reaction of the amine compound (A) with the quaternary ammonium compound (B) is 1:1 [N—H]:[$R^8$], where [N—H] represents the number of alkylatable amino groups of the amine compound (A) and [$R^8$] represents the number of amine-reactive groups $R^8$ of the quaternary ammonium compound (B), which is generally fixed at 1. As such, the amine compound (A) and the quaternary ammonium compound (B) are typically reacted in a stoichiometric ratio of from 10:1 to 1:10, alternatively from 8:1 to 1:8, alternatively from 6:1 to 1:6, alternatively from 4:1 to 1:4, alternatively from 2:1 to 1:2, alternatively 1:1 [N—H]:[$R^8$], where [N—H] and [$R^8$] are as defined above. In these or other embodiments, the amine compound (A) and the quaternary ammonium compound (B) are reacted in a molar ratio of from 10:1 to 1:10, alternatively from 8:1 to 1:8, alternatively from 6:1 to 1:6, alternatively from 4:1 to 1:4, alternatively from 2:1 to 1:2, alternatively 1:1.5, (A):(B).

It will be appreciated, however, that ratios outside of the specific ranges above may also be utilized. For example, in certain embodiments, the quaternary ammonium compound (B) is utilized in a gross excess (e.g. in an amount of ≥5, alternatively ≥10, alternatively ≥15, alternatively ≥20, times the stoichiometric or molar amount of the amine compound (A)), such as when the quaternary ammonium compound (B) is utilized as a carrier (i.e., a solvent, diluent, etc.) during the reaction. Likewise, in other embodiments, the amine compound (A) is utilized in a gross excess (e.g. in an amount of ≥5, alternatively ≥10, alternatively ≥15, alternatively ≥20, times the stoichiometric or molar amount of the quaternary ammonium compound (B)), such as when the amine compound (A) is utilized as a carrier (i.e., a solvent, diluent, etc.) during the reaction. Regardless, one of skill in the art will readily select the particular amounts and ratios of the various components to prepare the networked silicones according to the embodiments described herein, including the theoretical maximum reactivity ratios described above, the presence of any carrier vehicle(s), the particular components utilized, etc.

In some embodiments, the preparation method comprises reacting the amine compound (A) and the quaternary ammonium compound (B) in the presence of (C) a catalyst. The inclusion of the catalyst (C) is typically based on the selection of the amine-reactive group $R^8$ of the quaternary ammonium compound (B). Likewise, the particular type or specific compound(s) selected for use in or as the catalyst (C), will be readily selected by those of skill in the art based on the particular amine compound (A) and the quaternary ammonium compound (B) selected. More specifically, the catalyst (C) is selected to catalyze the coupling of the amine compound (A) with the quaternary ammonium compound (B), and thus will be selected based on the particular amine-reactive group $R^8$ of the quaternary ammonium compound (B utilized, the type of coupling reaction desired, etc. As such, the catalyst (C) is not particularly limited, and may comprise or be any compound suitable for facilitating the coupling of the amine compound (A) with the quaternary ammonium compound (B) (e.g. via reaction of/including the alkylatable amine of the amine compound (A) and amine-reactive group $R^8$ of the quaternary ammonium compound (B)), as will be understood by one of skill in the art in view of the description herein. For example, in certain embodiments, the catalyst (C) is selected from those facilitating reactions including ring-opening addition, nucleophilic substitution, nucleophilic additions, alkylation, condensation, and the like, as well as combinations of such reactions.

In some embodiments, the catalyst (C) comprises, alternatively is, an acid or base catalyst, such as an inorganic or organic base or acid (i.e., an acid-type or base-type catalyst), a Lewis acid or Lewis base, etc. In such embodiments, the catalyst (C) may comprise metal atoms, alternatively may be substantially free from, alternatively may be free from metal atoms. As understood by those of skill in the art, acid/base-type catalysts may be utilized to couple the amine compound (A) and the quaternary ammonium compound (B) via ring opening reaction, nucleophilic substitution, nucleophilic addition, condensation, etc.

Examples of acid/base-type catalysts suitable for use in or as the catalyst (C) include lithium hydroxide (LiOH), sodium hydroxide (NaOH), potassium hydroxide (KOH), cesium hydroxide (CsOH), tetramethylammonium hydroxide (($CH_3$)$_4$NOH), 1,8-diazabicyclo [5.4.0]undec-7-ene (DBU), sulfonic acids, sulfuric acid ($H_2SO_4$), carboxylic acids, mineral acids, and the like, as well as derivatives, modifications, and combinations thereof. In certain embodiments, the catalyst (C) comprises, alternatively is, a mineral acid, such as hydrochloric acid (HCl), nitric acid ($HNO_3$), phosphoric acid ($H_3PO_4$), sulfuric acid ($H_2SO_4$), boric acid ($H_3BO_3$), hydrofluoric acid (HF), hydrobromic acid (HBr), perchloric acid ($HClO_4$), and the like, or combinations thereof. In specific embodiments, the mineral acid is selected based on the anion X. For example, in certain embodiments anion X is $Cl^-$, and the catalyst (C) comprises, alternatively is, hydrochloric acid.

Methods of preparing compounds suitable for use in, or as, the catalyst (C) are well known in the art, and many of the compounds listed herein are commercially available from various suppliers. As such, the catalyst (C) may be prepared as part of the preparation method, or otherwise obtained (i.e., as a prepared compound). Additionally, preparing the catalyst (C) may be performed prior to the reaction of components (A) and (B), or in situ (i.e., during the reaction of components (A) and (B), e.g. via combining components of the catalyst (C) with components (A) and/or (B)).

The catalyst (C) may be utilized in any form, such as neat (i.e., absent solvents, carrier vehicles, diluents, etc.), or disposed in a carrier vehicle, such as a solvent or dispersant (e.g. such as any of those listed above). In some embodiments, the catalyst (C) is utilized in a form absent water and/or carrier vehicles/volatiles reactive with the components (A) and/or (B), the catalyst (C) itself (i.e., at least until combined with components (A) and (B)), and/or the cationic surfactant being prepared. For example, in certain embodiments, the preparation method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof. In other embodiments, the catalyst (C) is utilized as a solution or suspension in a carrier vehicle. For example, in some embodiments, the catalyst (C) comprises an aqueous solution of a mineral acid, such as HCl (aq.).

The catalyst (C) may be utilized in any amount, which will be selected by one of skill in the art, e.g. dependent upon the particular catalyst (C) selected (e.g. the concentration/amount of active components thereof, the type of catalyst being utilized, the type of coupling reaction being performed, etc.), the reaction parameters employed, the scale of the reaction (e.g. total amounts of components (A) and (B), etc. The molar ratio of the catalyst (C) to components (A) and/or (B) utilized in the reaction may influence the rate and/or amount of coupling thereof to prepare the cationic surfactant. Thus, the amount of the catalyst (C) as compared to components (A) and/or (B), as well as the molar ratios therebetween, may vary. Typically, these relative amounts and the molar ratio are selected to maximize the reaction of components (A) and (B) while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.000001 to 50 wt. %, based on the total amount of component (A) utilized (i.e., wt./wt.). For example, the catalyst (C) may be used in an amount of from 0.000001 to 40 wt. %, such as from 0.000001 to 20, alternatively of from 0.000001 to 10, alternatively of from 0.000002 to 5, alternatively of from 0.000002 to 2, alternatively of from 0.000002 to 0.5, alternatively of from 0.00001 to 0.5, alternatively of from 0.0001 to 0.5, alternatively of from 0.001 to 0.5, alternatively of from 0.01 to 0.5 wt. %, based on the total amount of component (A) utilized. Likewise, or alternatively, the catalyst (C) may be utilized in the reaction in an amount of from 0.000001 to 50 wt. %, based on the total amount of component (B) utilized (i.e., wt./wt.). For example, the catalyst (C) may be used in an amount of from 0.000001 to 40 wt. %, such as from 0.000001 to 20, alternatively of from 0.000001 to 10, alternatively of from 0.000002 to 5, alternatively of from 0.000002 to 2, alternatively of from 0.000002 to 0.5, alternatively of from 0.00001 to 0.5, alternatively of from 0.0001 to 0.5, alternatively of from 0.001 to 0.5, alternatively of from 0.01 to 0.5 wt. %, based on the total amount of component (B) utilized. It will be appreciated that ratios outside of these ranges may be utilized as well.

In some embodiments (e.g. when the type of crosslinking reaction dictates a stoichiometric loading), the amount of the catalyst (C) utilized may be selected and/or determined on a molar ratio based on one or more components of the reaction, as will be understood by those of skill in the art. In such embodiments, the catalyst (C) may be utilized in the reaction in an amount of from 0.001 to 50 mol %, based on the total amount of component (A) or (B) utilized. For example, the catalyst (C) may be used in an amount of from 0.005 to 40, alternatively of from 0.005 to 30, alternatively of from 0.005 to 20, alternatively of from 0.01 to 20 mol %, based on the total amount of component (A) utilized, the total amount of component (B) utilized, or the total (i.e., combined) amount of components (A) and (B) utilized. However, it will also be appreciated that ratios outside of these ranges may be utilized.

Reacting the amine compound (A) and the quaternary ammonium compound (B) generally comprises combining the amine compound (A) and the quaternary ammonium compound (B). Said differently, there is generally no proactive step required for the reaction reduction beyond combining the amine compound (A) and the quaternary ammonium compound (B), although various optional steps are described herein.

Typically, components (A) and (B), and optionally (C), are reacted in a vessel or reactor to prepare the networked silicone. When the reaction is carried out at an elevated or reduced temperature as described below, the vessel or reactor may be heated or cooled in any suitable manner, e.g. via a jacket, mantle, exchanger, bath, coils, etc.

Components (A) and (B), and optionally (C), may be fed together or separately to the vessel, or may be disposed in the vessel in any order of addition, and in any combination. For example, in certain embodiments, components (B) and (C) are added to a vessel containing component (A). In such embodiments, components (B) and (C) may be first combined prior to the addition, or may be added to the vessel sequentially (e.g. (C) then (B)). In other embodiments, component (C) is added to a vessel containing components (A) and (B), either as a premade catalyst or as individual components to form the catalyst (C) in situ. In general, reference to the "reaction mixture" herein refers generally to a mixture comprising components (A) and (B), and optionally (C) if utilized, (e.g. as obtained by combining such components, as described above).

The preparation method may further comprise agitating the reaction mixture. The agitating may enhance mixing and contacting together components (A), (B), and optionally (C), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., crosslinking), of the amine compound (A) with the quaternary ammonium compound (B) to form the cationic surfactant. Other conditions may be result-effective conditions for enhancing reaction yield or minimizing amount of a particular reaction by-product included within the reaction product along with the cationic surfactant.

The components (A) and (B) may be reacted under homogeneous or heterogeneous conditions, e.g. such as in a homogeneous solution or a multiphase (e.g. biphasic) reaction. The particular form and condition of the reaction of components (A) and (B), optionally in the presence of component (C) are independently selected, as will be appreciated from the exemplary embodiments herein.

In certain embodiments, depending on the particular quaternary ammonium compound (B) utilized, the reaction of components (A) and (B) may produce byproducts. In such embodiments, these byproducts may be removed from the reaction mixture once produced. As understood in the art, some of the coupling reactions are reversible reactions, such that removing the byproducts from the reaction mixture influences the reaction in terms of selectivity in favor, and/or overall yields, of the cationic surfactant (e.g. by selectively driving the equilibrium of the reaction toward that product). Removing the byproducts may include distillation, heating, applying reduced pressure/vacuum, azeotroping with solvents, utilizing molecular sieves, etc., and combinations thereof, even during the reaction.

In some embodiments, the reaction is carried out at an elevated temperature. The elevated temperature will be selected and controlled depending on the particular amine compound (A) selected, the particular quaternary ammonium compound (B) selected, the reaction vessel selected (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 300° C., such as from alternatively from 30 to 260, alternatively from 30 to 250, alternatively from 35 to 250, alternatively from 35 to 225, alternatively from 35 to 200, alternatively from 40 to 200, alternatively from 40 to 180, alternatively from 40 to 160, alternatively from 45 to 140, alternatively from 45 to 120, alternatively from 40 to 120° C.

It is to be appreciated that the elevated temperature may differ from the ranges set forth above, especially when both elevated temperature and another condition (e.g. reduced pressure) are utilized in combination. Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the reaction, or may be static (e.g. for the duration of the reaction, or for any portion thereof).

The time during which the reaction of components (A) and (B) to prepare the cationic surfactant is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 240, alternatively from 2 to 120, alternatively from 2 to 96, alternatively from 2 to 72, alternatively from 2 to 48, alternatively from 3 to 36, alternatively from 4 to 24, alternatively of 6, 12, 18, 24, 36, or 48 hours, as will be readily determined by one of skill in the art (e.g. by monitoring conversion of the amine compound (A), production of the cationic surfactant, etc., such as via chromatographic and/or spectroscopic methods). In certain embodiments, the time during which the reaction is carried out is from greater than 0 to 240 hours, alternatively from 1 to 120 hours, alternatively from 1 to 96 hours, alternatively from 1 to 72 hours, alternatively from 1 to 48 hours, alternatively from 1 to 36 hours, alternatively from 1 to 24 hours, alternatively from 1 to 12 hours, alternatively from 2 to 12 hours, alternatively from 2 to 8 hours, after components (A) and (B) are combined, optionally in the presence of component (C). In specific embodiments, the time during which the reaction is carried out is from greater than 0 to 10 hours, such as from 1 minute to 8 hours, alternatively from 5 minutes to 6 hours, alternatively from 10 minutes to 4 hours, alternatively from 30 minutes to 3 hours.

Generally, the reaction of components (A) and (B) prepares a reaction product comprising the cationic surfactant. In particular, over the course of the reaction, the reaction mixture comprising components (A) and (B) comprises increasing amounts of the cationic surfactant and decreasing amounts of components (A) and (B). Once the reaction is complete (e.g. one of components (A) and (B) is consumed, no additional cationic surfactant is being prepared, etc.), the reaction mixture may be referred to as a reaction product comprising the cationic surfactant. In this fashion, the reaction product typically includes any remaining amounts of components (A) and (B), and optionally (C), as well as degradation and/or reaction products thereof (e.g. byproducts and/or other materials which were not previously removed via any distillation, stripping, etc.). If the reaction is carried out in any carrier vehicle or solvent, the reaction product may also include such carrier vehicle or solvent.

In some embodiments, the preparation method comprises adjusting the pH of the reaction product. As will be understood by those of skill in the art, adjusting the pH of the reaction product comprises adding an acid or base thereto to increase or decrease the pH, respectively. For example, in certain embodiments, adjusting the pH comprises adding an acid (e.g. HCl) in an amount sufficient to adjust the pH of the reaction product to ≥8, alternatively ≥9. In some embodiments, the preparation method comprises adding the acid in an amount sufficient to protonate some, but not all, amine groups of the cationic surfactant, such that the reaction product is prepared as a buffered solution (i.e., with both free-amine groups as well as protonated forms (e.g. ammonium cations) thereof).

In certain embodiments, the preparation method further comprises isolating and/or purifying the cationic surfactant from the reaction product. As used herein, isolating the cationic surfactant is typically defined as increasing the relative concentration of the cationic surfactant as compared to other compounds in combination therewith (e.g. in the reaction product or a purified version thereof). As such, as is understood in the art, isolating/purifying may comprise removing the other compounds from such a combination (i.e., decreasing the amount of impurities combined with the cationic surfactant, e.g. in the reaction product) and/or removing the cationic surfactant itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the cationic surfactant. It is to be appreciated that isolating may include, and thus may be referred to as, purifying the cationic surfactant. However, purifying the cationic surfactant may comprise alternative and/or additional techniques as compared to those utilized in isolating the cationic surfactant. Regardless of the particular technique(s) selected, isolation and/or purification of cationic surfactant may be performed in sequence (i.e., in line) with the reaction itself, and thus may be automated. In other instances, purification may be a stand-alone procedure to which the reaction product comprising the cationic surfactant is subjected.

In particular embodiments, isolating the cationic surfactant comprises altering the solubility profile of the carrier vehicle, e.g. by adding additional organic or aqueous solvent thereto, e.g. to partition and/or phase separate the reaction product. In these or other embodiments, isolating the cationic surfactant comprises filtering away other components of the reaction product (i.e., where the cationic surfactant is present in a residue/solid. In these or other embodiments, isolating the cationic surfactant comprises washing away other components of the reaction product from the cationic surfactant (e.g. with organic and/or aqueous solvents). In certain embodiments, isolating the cationic surfactant comprises stripping solvents and/or other volatile components therefrom, which encompasses drying the cationic surfactant.

The following examples, illustrating embodiments of this disclosure, are intended to illustrate and not to limit the invention. The brief summary immediately below provides information as to certain abbreviations, shorthand notations, and components utilized in the Examples. Each group not expressly shown and pending from a silicon atom is a methyl group (—CH$_3$) unless otherwise indicated.

"Si10PrCl" is a branched organosilicon having 10 silicon atoms and a chloropropyl group (PrCl; —CH$_2$CH$_2$CH$_2$—Cl), and is of the general formula (a) below.

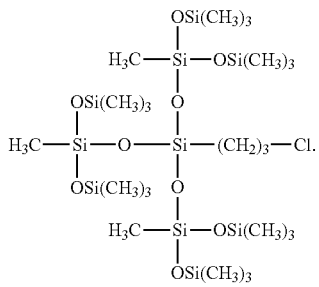

(a)

"Si7PrCl" is a branched organosilicon having 7 silicon atoms and a chloropropyl group (PrCl; —CH$_2$CH$_2$CH$_2$—Cl), and is of the general formula (b) below.

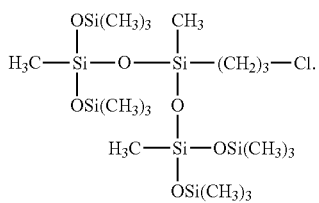

(b)

"Si4PrCl" is 3-(3-chloropropyl)-1,1,1,5,5,5-hexamethyl-3-((trimethylsilyl)oxy)trisiloxane, a branched organosilicon having 4 silicon atoms and a chloropropyl group (PrCl; —CH$_2$CH$_2$CH$_2$—Cl) of the general formula (c) below.

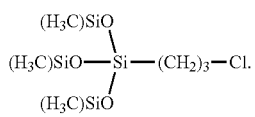

(c)

"Si10PDA" is a branched organosilicon having 10 silicon atoms and a propyldiaminopropyl group (PrNHPrNH$_2$; —(CH$_2$)$_3$NH(CH$_2$)$_3$NH$_2$), and is of the general formula (d) below.

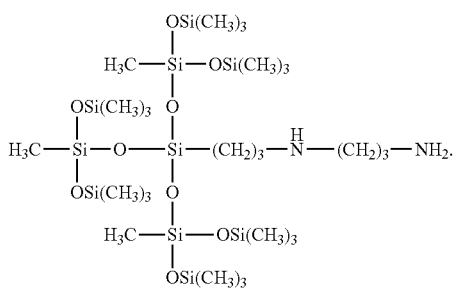

(d)

Si7PDA" is a branched organosilicon having 7 silicon atoms and a propyldiaminopropyl group (PrNHPrNH$_2$; —(CH$_2$)$_3$NH(CH$_2$)$_3$NH$_2$), and is of the general formula (e) below.

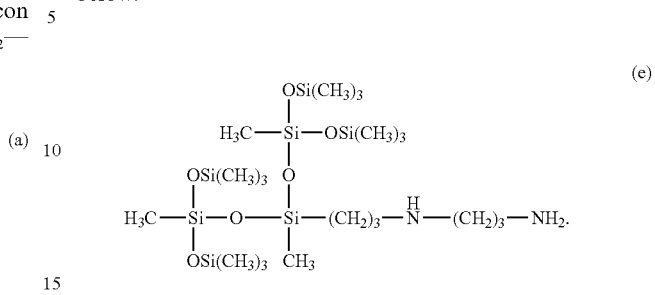

(e)

Si4PDA" is a branched organosilicon having 4 silicon atoms and a propyldiaminopropyl group (PrNHPrNH$_2$; —(CH$_2$)$_3$NH(CH$_2$)$_3$NH$_2$), and is of the general formula (f) below.

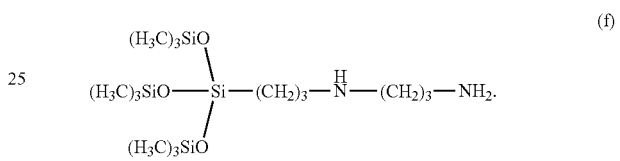

(f)

Preparation Example 1: Preparation of 3-(3-chloropropyl)-1,1,1,5,5,5-hexamethyl-3-((trimethylsilyl)oxy)trisiloxane (Si4PrCl)

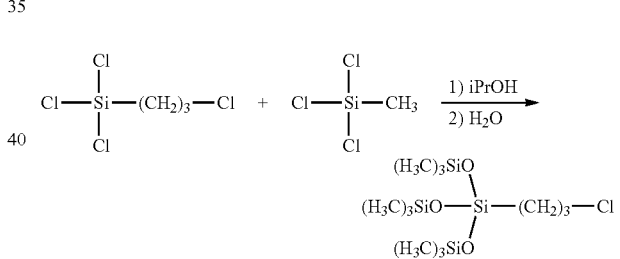

In a glove box, Trichloro(3-chloropropyl)silane (12.718 g, 60 mmol) and chlorotrimethylsilane (39.110 g, 360 mmol) are weighed and mixed into a 250 mL three-necked flask equipped with a stir bar, an additional funnel, thermowell, nitrogen inlet, and a nitrogen outlet connected to a NaHCO$_3$ scrubber. The system is cooled by water bath (20-23° C.), and charged with anhydrous 2-propanol (32.454 g, 540 mmol) dropwise over 18 minutes, and the resulting mixture stirred for 1.5 hours. The mixture is then cooled with an ice bath, deionized water (9.720 g, 540 mmol) is added slowly (temperature raises from 2.8 to 21° C. during DI H2O addition), and the resulting mixture maintained in the ice batch with stirring for 1 hour 45 minutes. The ice bath is then removed, the mixture stirred at room temperature for 3 hours 15 minutes (5 hour, total reaction time). Toluene (100 mL) is added and the resulting mixture stirred for 5 minutes at room temperature, transferred to a separatory funnel. The aqueous phase was removed, and the remaining toluene phase washed with water (2×100 mL), 10% NaHCO$_3$/H$_2$O solution (2×100 mL), and water (3×100 mL), dried over MgSO$_4$, and filtered into a flask. The solution is then concentrated with a rotary evaporator to give the product as a clear oil (Si4PrCl: 20.98 g; 95% GC area; 89% yield), which is analyzed by $^1$H, $^{13}$C, and $^{29}$Si NMR ($C_6D_6$ as a solvent). The NMR results are consistent with the structure shown above.

Preparation Example 2: Preparation of Si7PrCl 1,1,1,3,5,5,5-heptamethyltrisiloxane (255 g) is charged to a 500 mL 4-neck flask equipped with a thermal couple, mechanical stirrer, addition funnel, and a water-cooled condenser adapted to a $N_2$ bubbler. Tris(pentafluorophenyl)borane (BCF; 50 ppm) is then added to the flask. 3-chloropropylmethyldimethoxysilane (96.3 g, Gelest, Inc.) and BCF (150 ppm) are mixed in the addition funnel to form a catalyzed mixture, which is then slowly added into the flask over 30 minutes while an ice water bath is used to remove heat and control the pot temperature to below 30° C. The mixture is then stirred for 1 hour at room temperature, at which time $^1$H NMR indicates that conversion is >99%. The mixture is then concentrated with a rotary evaporator (110° C.; 1 Torr; 30 minutes) to give the product (Si7PrCl).

Preparation Example 3: Preparation of Si10PrCl 1,1,1,3,5,5,5-heptamethyltrisiloxane (470 g) is charged to a 1000 mL 4-neck flask equipped with a thermal couple, mechanical stirrer, addition funnel, and a water-cooled condenser adapted to a $N_2$ bubbler. Tris(pentafluorophenyl)borane (BCF; 25 ppm) is then added to the flask. 3-chloropropyltrimethoxysilane (130.6 g, Gelest, Inc.) and BCF (175 ppm) are mixed in the addition funnel to form a catalyzed mixture, which is then slowly added into the flask over 58 minutes while an ice water bath is used to remove heat and control the pot temperature to below 30° C. The mixture is then stirred for 2 hour at room temperature, at which time $^1$H NMR indicates that conversion is 100%. The mixture is then concentrated with a rotary evaporator (130° C.; 1 Torr; 60 minutes) to give the product (Si10PrCl).

Preparation Example 4: Preparation of Si4PDA

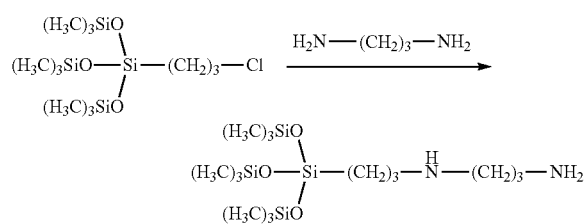

A 20 mL sample vial is charged with 1,3-diaminopropane (7.15 g) and Si4PrCl (12.05 g), then heated to 120° C. and mixed for ~17 hours. The mixture is then cooled to room temperature and transferred to a 100 mL glass sample jar. DI water (32.5 g) and heptane (10.36 g) are added the jar, and the biphasic mixture stirred with the jar left uncapped to avoid pressure build up. The sample is then allowed to rest until the two-phase solution fully separates. The top layer is then removed to a single neck round bottom flask and stripped via rotary evaporator (60° C.; ~15 mmHg) to remove heptane and give the final product ((Si4-Pr-diaminopropane ("Si4PDA"); 10.86 g recovered).

Preparation Example 5: Preparation of Si7PDA

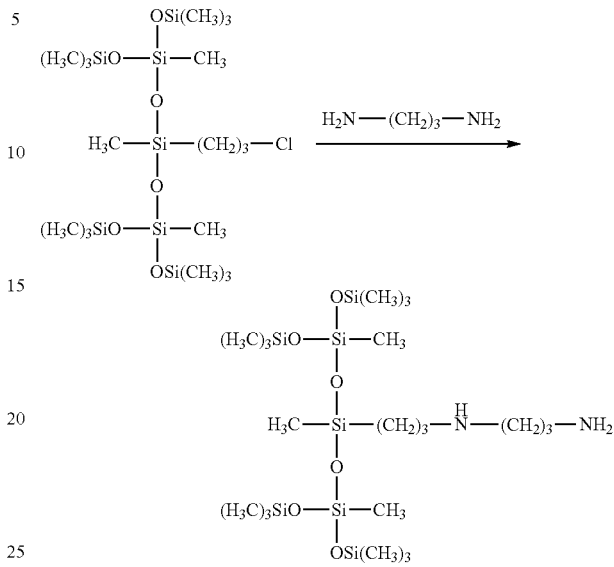

Two 20 mL sample vials are each charged with 1,3-diaminopropane (5.62 g) and Si7PrCl (14.59 g), then heated to 120° C. and mixed for ~15 hours. Each mixture is then cooled to room temperature and combined in a 500 mL glass sample jar for a total of 39.17 g of reaction solution. DI water (38.72 g) and heptane (37.80 g) are added the jar, and the biphasic mixture stirred with the jar left uncapped to avoid pressure build up. The sample is then allowed to rest until the two-phase solution fully separates. The top layer is then removed via syringe, filtered through a syringe filter (2.0 μm) into a flask, and stripped via simple distillation (60° C. and ~20 mmHg) to remove heptane and give the final product (Si7-Pr-diaminopropane ("Si7PDA")).

Preparation Example 6: Preparation of Si10PDA

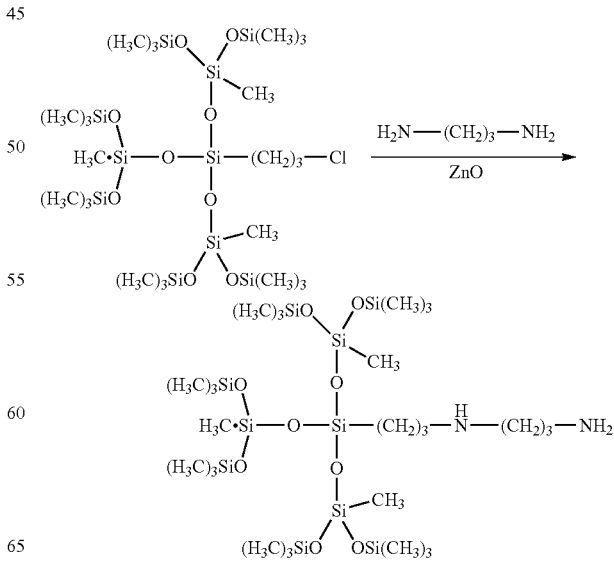

A 200 mL receiving flask is charged with Si10PrCl (50 g), 1,3-diaminopropane (25 g), and ZnO (2.62 g), and then heated to and held at 140° C. for 9 hours using an oil bath. The mixture is then cooled to room temperature, filtered to remove solids, and phase separated. The top layer is collected and concentrated with a rotary evaporator (120° C.; <1 mmHg; 60 minutes) to give the product (Si10PDA; nearly colorless).

Example 1: Synthesis of Si4(QUAB)

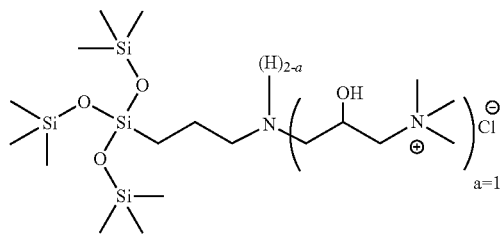

3-aminopropyltris(trimethylsiloxy)silane (6.34 g), glycidyltrimethylammonium chloride (4.09 g; 72.7% solution in water), ethanol (5.50 g), and HCl (0.66 g; 0.1N) are mixed in a 1 oz vial and stirred on a 60° C. heating block to give a mixture, which turns clear within ~9 minutes. The mixture is stirred for 1 hour and 40 minutes, then HCl (3.10 g; 2N) is added and the solution stirred at RT for 1 hour to give a reaction product comprising a cationic surfactant (Si4 (QUAB); 47.1% concentration).

Example 2: Synthesis of Si4(QUAB)$_{1.5}$

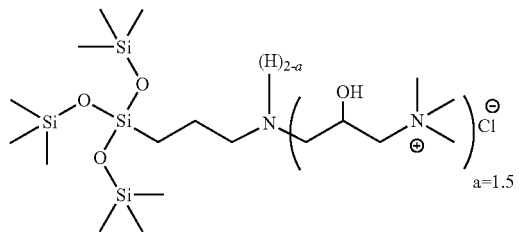

3-aminopropyltris(trimethylsiloxy)silane (6.35 g), glycidyltrimethylammonium chloride (6.01 g; 72.7% solution in water), ethanol (5.86 g), and HCl (1.5 g; 0.1 N) are mixed in a 1 oz vial and stirred on a 60° C. heating block to give a mixture, which turns clear within ~15 minutes. The mixture is stirred for 1 hour and 40 minutes, then HCl (3.09 g; 2N) is added and the solution stirred at RT for 1 hour to give a reaction product comprising a cationic surfactant (Si4(QUAB)$_{1.5}$; adjusted to 40 wt. % concentration with water).

Example 3: Synthesis of C6N(QUAB)

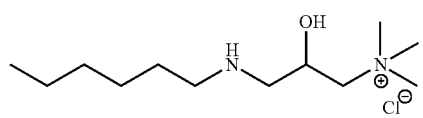

1-hexylamine (2.82 g), glycidyltrimethylammonium chloride (6.21 g; 72.7% solution in water), ethanol (5.02 g), and HCl (1.35 g; 0.1 N) are mixed in a 1 oz vial and stirred on a 60° C. heating block to give a mixture, which turns clear within ~2 minutes. The mixture is stirred for 2.5 hours, then HCl (4.69 g; 2N) is added and the solution stirred at RT for 1 hour to give a reaction product comprising a cationic surfactant (C6N(QUAB); 36.7 wt. % concentration).

Example 4: Synthesis of C8N(QUAB)

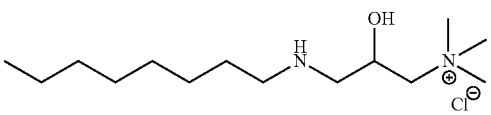 [SMILES: CCCCCCCCNCC(O)C[N+](C)(C)C ; [Cl-]]

1-octylamine (3.60 g), glycidyltrimethylammonium chloride (6.21 g; 72.7% solution in water), ethanol (5.04 g), and HCl (1.35 g; 0.1 N) are mixed in a 1 oz vial and stirred on a 60° C. heating block to give a mixture, which turns clear within ~3 minutes. The mixture is stirred for 2.5 hours, then HCl (4.76 g; 2N) is added and the solution stirred at RT for 1 hour to give a reaction product comprising a cationic surfactant (C8N(QUAB); 38.6 wt. % concentration).

Example 5: Synthesis of C10N(QUAB)

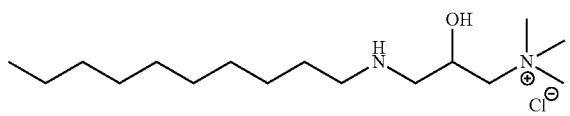 [SMILES: CCCCCCCCCCNCC(O)C[N+](C)(C)C ; [Cl-]]

1-decylamine (4.38 g), glycidyltrimethylammonium chloride (6.19 g; 72.7% solution in water), ethanol (5.00 g), and HCl (1.35 g; 0.1 N) are mixed in a 1 oz vial and stirred on a 60° C. heating block to give a mixture, which turns clear within ~4 minutes. The mixture is stirred for 2.5 hours, then HCl (4.72 g; 2N) is added and the solution stirred at RT for 1 hour to give a reaction product comprising a cationic surfactant (C10N(QUAB); 40.8 wt. % concentration).

Example 6: Synthesis of Si4PDA(QUAB)

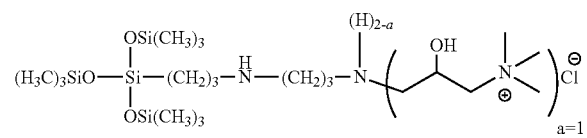

Si4PDA (4.63 g), glycidyltrimethylammonium chloride (1.47 g; 72.7% solution in water), ethanol (4.08 g), and HCl (1.18 g; 0.1N) are mixed in a 1 oz vial and stirred on a 60° C. heating block to give a mixture, which turns clear after 25 minutes. The mixture is stirred for 3 hours, then allowed to cool to give aa reaction product comprising a cationic surfactant (Si4PDA(QUAB); 53.7 wt. % concentration).

Example 7: Synthesis of Si7PDA-QUAB

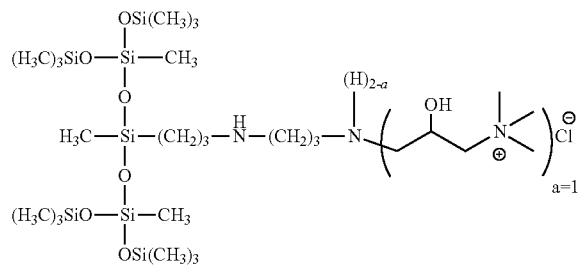

Si7PDA (2.64 g), glycidyltrimethylammonium chloride (0.46 g; 72.7% solution in water), ethanol (3.00 g), and HCl (0.05 g; 0.1 N) are mixed in a 1 oz vial and stirred on a 50° C. heating block to give a mixture, which turns clear immediately. The mixture is stirred for 3 hours, then HCl (1.29 g; 2N) is added and the solution stirred at RT for 1 hour to give a reaction product comprising a cationic surfactant (Si7PDA(QUAB); 38.8 wt. % concentration).

Example 8: Synthesis of Si7PDA(QUAB)$_{1.5}$

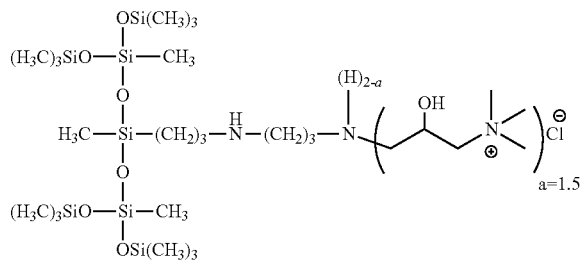

Si7PDA (2.18 g), glycidyltrimethylammonium chloride (0.88 g; 1.5 eq.; 72.7% solution in water), ethanol (3.00 g), and HCl (0.08 g; 0.1 N) are mixed in a 1 oz vial and stirred on a 50° C. heating block to give a mixture, which turns clear immediately. The mixture is stirred for 3 hours, then HCl (1.12 g; 2N) is added and the solution stirred at RT for 1 hour to give a reaction product comprising a cationic surfactant (Si7PDA(QUAB)$_{1.5}$; 39.3 wt. % concentration).

Example 9: Synthesis of Si10PDA-QUAB

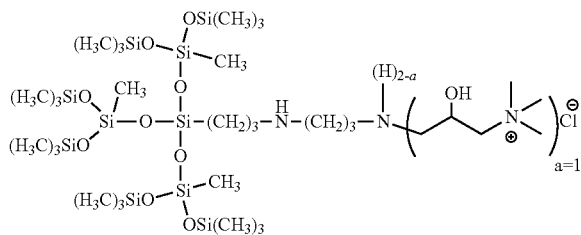

Si10PDA (2.66 g), glycidyltrimethylammonium chloride (0.40 g; 72.7% solution in water), ethanol (3.00 g), and HCl (0.04 g; 0.1N) are mixed in a 1 oz vial and stirred on a 50° C. heating block to give a mixture, which turns clear immediately. The mixture is stirred for 3 hours, then HCl (0.99 g; 2N) is added and the solution stirred at RT for 1 hour to give a reaction product comprising a cationic surfactant (Si10PDA(QUAB); 41.7 wt. % concentration).

Example 10: Synthesis of Si10PDA(QUAB)$_{1.5}$

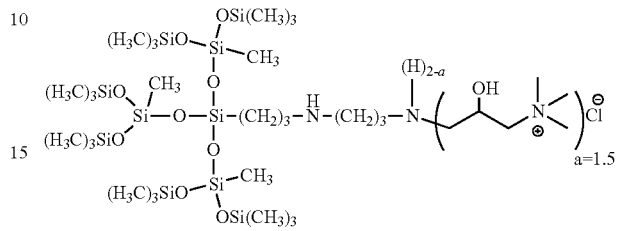

Si10PDA (2.40 g), glycidyltrimethylammonium chloride (0.70 g; 1.5 eq.; 72.7% solution in water), ethanol (3.00 g), and HCl (0.06 g; 0.1 N) are mixed in a 1 oz vial and stirred on a 50° C. heating block to give a mixture, which turns clear immediately. The mixture is stirred for 3 hours, then HCl (0.88 g; 2N) is added and the solution stirred at RT for 1 hour to give a reaction product comprising a cationic surfactant (Si10PDA(QUAB)$_{1.5}$; 41.3 wt. % concentration).

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", "perpendicular", and "parallel" are generally employed herein in a relative and not an absolute sense. Further, it will be appreciated that the terms "substantially", "about", "essentially", etc. indicate minor deviations of the property being modified. Such deviation may be of from 0-10%, alternatively of from 0-5%, alternatively of from 0-3% of a particular property.

Likewise, it is also to be understood that the appended claims are not limited to express and particular assemblies, systems, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A cationic surfactant having general formula (I):

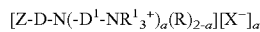

(I), wherein Z is a siloxane moiety comprising an inorganic silicon-oxygen-silicon group, with organosilicon and/or organic side groups attached to the silicon atoms; D is a covalent bond or a divalent linking group; $D^1$ is a divalent linking group; R is H or an unsubstituted hydrocarbyl group having from 1 to 4 carbon atoms; each $R^1$ is an independently selected unsubstituted hydrocarbyl group having from 1 to 4 carbon atoms; subscript a is 1 or 2; and each X is an anion.

2. The cationic surfactant of claim 1, wherein: (i) D is the divalent linking group; (ii) subscript a is 1 and R is H; or (iii) a combination thereof.

3. The cationic surfactant of claim 1, wherein the siloxane moiety Z has the formula:

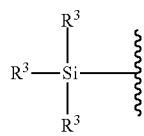

where each $R^3$ is independently selected from $R^2$ and —OSi$(R^4)_3$, with the proviso that at least one $R^3$ is —OSi$(R^4)_3$; where each $R^4$ is independently selected from $R^2$, —OSi$(R^5)_3$, and —[OSiR$^2{}_2]_m$OSiR$^2{}_3$; where each $R^5$ is independently selected from $R^2$, —OSi$(R^6)_3$, and —[OSiR$^2{}_2]_m$OSiR$^2{}_3$; where each $R^6$ is independently selected from $R^2$ and —[OSiR$^2{}_2]_m$OSiR$^2{}_3$; where 0≤m≤100; and where each $R^2$ is independently a substituted or unsubstituted hydrocarbyl group.

4. The cationic surfactant of claim 3, wherein each $R^3$ is —OSi$(R^4)_3$, where $R^4$ is independently selected and as defined above.

5. The cationic surfactant of claim 1, wherein the siloxane moiety Z has one of the following structures (i)-(iv):

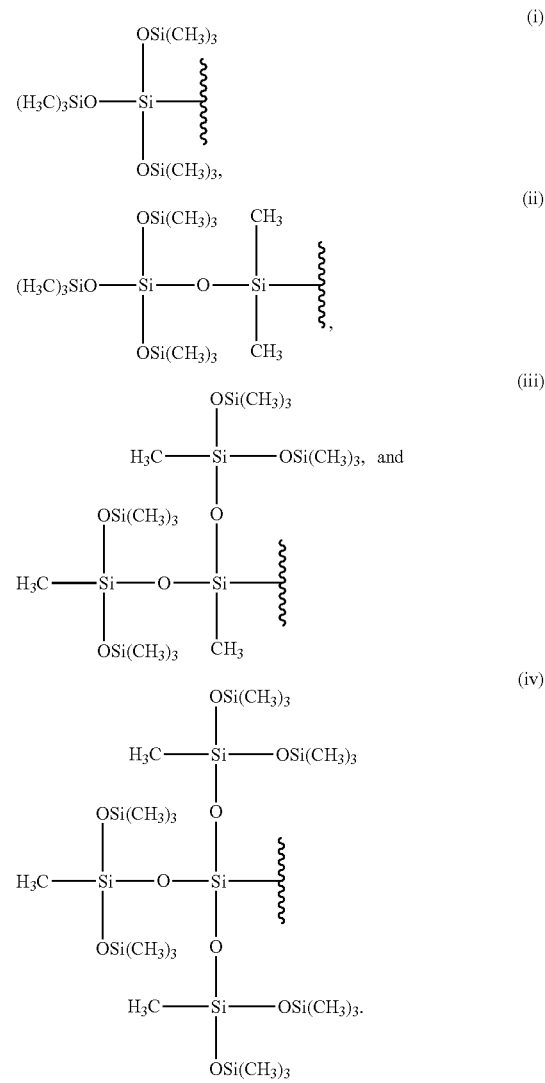

6. The cationic surfactant of claim 1, wherein D is the divalent linking group, and wherein: (i) the divalent linking group D is a branched or linear alkylene group; or (ii) the divalent linking group D has formula -$D^2$-NY-$D^2$-, where each $D^2$ is an independently selected divalent linking group, and Y is H or -($D^1$-NR$^1{}_3$)+X$^-$, where $D^1$, $R^1$, and X are as defined above.

7. The cationic surfactant of claim 6, wherein the divalent linking group D has formula -$D^2$-NY-$D^2$-, where each $D^2$ and Y are as defined above, and wherein: (i) each $D^2$ is an independently selected alkylene group having from 1 to 8 carbon atoms; (ii) Y is -($D^1$NR$^1{}_3$)+X$^-$, where $D^1$, $R^1$, and X are as defined above; or (iii) both (i) and (ii).

8. The cationic surfactant of claim 1, wherein: (i) each $D^1$ is —CH$_2$CH(OH)CH$_2$—; (ii) each $R^1$ is methyl; (iii) each X is Cl; or (iv) any combination of (i) to (iii).

9. A method of preparing a cationic surfactant, said method comprising:

reacting (A) an amine compound and (B) a quaternary ammonium compound to give the cationic surfactant;

wherein the amine compound (A) has the general formula (II):

Z-D-NHR       (II), where Z is a siloxane moiety comprising an inorganic silicon-oxygen-silicon group, with organosilicon and/or organic side groups attached to the silicon atoms, D is a covalent bond or a divalent linking group, and R is H or an unsubstituted hydrocarbyl group having from 1 to 4 carbon atoms;

wherein the quaternary ammonium compound (B) has the general formula (III):

$[R^8NR^1_3]^+[X]^-$       (III), where $R^8$ is an amine-reactive group; each $R^1$ is an independently selected unsubstituted hydrocarbyl group having from 1 to 4 carbon atoms; and X is an anion; and wherein the cationic surfactant is the cationic surfactant of claim 1.

10. The method of claim 9, wherein: (i) the siloxane moiety Z the has the formula:

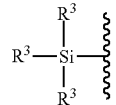

where each $R^3$ is independently selected from $R^2$ and $-OSi(R^4)_3$, with the proviso that at least one $R^3$ is $-OSi(R^4)_3$; where each $R^4$ is independently selected from $R^2$, $-OSi(R^5)_3$, and $-[OSiR^2_2]_m OSiR^2_3$; where each $R^5$ is independently selected from $R^2$, $-OSi(R^6)_3$, and $-[OSiR^2_2]_m OSiR^2_3$; where each $R^6$ is independently selected from $R^2$ and $-[OSiR^2_2]_m OSiR^2_3$; where $0 \leq m \leq 100$; and where each $R^2$ is independently a substituted or unsubstituted hydrocarbyl group; (ii) D is the divalent linking group; (iii) R is H; or (iv) any combination of (i) to (iii).

11. The method of claim 9, wherein D is the divalent linking group, and wherein: (i) the divalent linking group D is a branched or linear alkylene group; or (ii) the divalent linking group D has formula $-D^2-NH-D^2-$, where each $D^2$ is an independently selected divalent linking group.

12. The method of claim 9, wherein: (i) $R^8$ is an epoxypropyl group; (ii) each $R^1$ is methyl; (iii) each X is Cl; or (iv) any combination of (i) to (iii).

13. A cationic surfactant prepared in accordance with the method of claim 9.

* * * * *